United States Patent
Kim et al.

(10) Patent No.: US 10,932,121 B2
(45) Date of Patent: Feb. 23, 2021

(54) METHOD FOR TRANSMITTING DATA ACCORDING TO EDT

(71) Applicant: LG Electronics Inc., Seoul (KR)

(72) Inventors: Taehun Kim, Seoul (KR); Hongsuk Kim, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/242,458

(22) Filed: Jan. 8, 2019

(65) Prior Publication Data

US 2019/0141515 A1 May 9, 2019

Related U.S. Application Data

(63) Continuation of application No. PCT/KR2018/004897, filed on Apr. 27, 2018.

(Continued)

(30) Foreign Application Priority Data

Apr. 5, 2018 (KR) .................. 10-2018-0040020

(51) Int. Cl.
*H04W 8/08* (2009.01)
*H04W 76/27* (2018.01)
(Continued)

(52) U.S. Cl.
CPC .......... *H04W 8/08* (2013.01); *H04W 28/02* (2013.01); *H04W 36/0022* (2013.01); *H04W 52/0216* (2013.01); *H04W 52/0219* (2013.01); *H04W 52/0229* (2013.01); *H04W 74/0833* (2013.01); *H04W 76/27* (2018.02); *H04W 76/28* (2018.02); *H04W 80/02* (2013.01)

(58) Field of Classification Search
None
See application file for complete search history.

(56) References Cited

U.S. PATENT DOCUMENTS

| | | | |
|---|---|---|---|
| 2008/0051084 A1* | 2/2008 | Casati | H04W 28/18 455/435.1 |
| 2014/0016614 A1* | 1/2014 | Velev | H04W 36/14 370/331 |

(Continued)

FOREIGN PATENT DOCUMENTS

| | | |
|---|---|---|
| JP | 2016181929 | 10/2016 |
| KR | 101690718 | 12/2016 |
| WO | 2017014533 | 1/2017 |

OTHER PUBLICATIONS

3GPP TSG RAN WG2 Meeting #101, R2-1802222, Early DL data transmission, Athens, Greece, Feb. 26-Mar. 2, 2018 (Year: 2018).*

(Continued)

*Primary Examiner* — Kodzovi Acolatse
(74) *Attorney, Agent, or Firm* — Fish & Richardson P.C.

(57) ABSTRACT

One disclosure of the present specification provides a method for supporting early data transmission (EDT) by a base station. The method may comprise a step of receiving a first message from a mobility management entity (MME). A first NAS message may include downlink data. The method may further comprise a step of confirming that there is no additional data other than the downlink data, on the basis of reception of the first NAS message.

10 Claims, 18 Drawing Sheets

Related U.S. Application Data

(60) Provisional application No. 62/581,045, filed on Nov. 3, 2017, provisional application No. 62/491,333, filed on Apr. 28, 2017.

(51) Int. Cl.

| | | |
|---|---|---|
| *H04W 52/02* | (2009.01) | |
| *H04W 28/02* | (2009.01) | |
| *H04W 76/28* | (2018.01) | |
| *H04W 36/00* | (2009.01) | |
| *H04W 74/08* | (2009.01) | |
| *H04W 80/02* | (2009.01) | |

(56) References Cited

U.S. PATENT DOCUMENTS

| | | | |
|---|---|---|---|
| 2017/0086062 A1 | 3/2017 | Chen | |
| 2018/0035470 A1* | 2/2018 | Chen | H04W 48/16 |
| 2018/0213576 A1* | 7/2018 | Koskinen | H04W 76/11 |
| 2018/0324869 A1* | 11/2018 | Phuyal | H04W 74/0833 |
| 2018/0359803 A1* | 12/2018 | Haneji | H04W 4/70 |
| 2019/0014530 A1* | 1/2019 | Aghili | H04W 28/12 |
| 2019/0037377 A1* | 1/2019 | Ke | H04W 4/70 |
| 2019/0037441 A1* | 1/2019 | Liu | H04W 28/06 |
| 2019/0045349 A1* | 2/2019 | Kim | H04W 8/02 |
| 2019/0053324 A1* | 2/2019 | Tseng | H04W 76/30 |
| 2019/0104553 A1* | 4/2019 | Johansson | H04W 76/19 |
| 2019/0104564 A1* | 4/2019 | Johansson | H04W 76/19 |
| 2019/0174554 A1* | 6/2019 | Deenoo | H04W 80/02 |
| 2019/0223221 A1* | 7/2019 | Johansson | H04W 68/02 |
| 2020/0037345 A1* | 1/2020 | Ryoo | H04W 76/10 |
| 2020/0037368 A1* | 1/2020 | Hoglund | H04W 74/0833 |
| 2020/0187245 A1* | 6/2020 | Fujishiro | H04W 74/002 |

OTHER PUBLICATIONS

Ericsson, "Early data transmission for NB-IoT," 'R1-1705189', 3GPP TSG RAN1#88bis, Spokane, US, Apr. 3-7, 2017, 10 pages.

ZTE, ZTE Microelectronics, "On early data transmission for NB-IoT," 'R1-1705489', 3GPP TSG RAN WG1 Meeting #88bis, Spokane, USA Apr. 3-7, 2017, 5 pages.

Huawei, "Consideration on early data transmission," 'R3-170966', 3GPP TSG-RAN3 Meeting #95bis, Spokane, Washington, USA, Apr. 3-7, 2017, 4 pages.

HTC, "RRC aspects in NB-IoT," R2-156425, 3GPP TSG-RAN2 Meeting #92, Anaheim, USA, Nov. 16-20, 2015, 19 pages.

Ericsson, "Early data transmission for NB-IoT," R1-1705189, 3GPP TSG RAN1#88bis, Spokane, US, Apr. 3-7, 2017, 8 pages.

LG Electronics, "Data transmission during random access procedure in MTC," R1-1704846, 3GPP TSG RAN WG1 Meeting #88bis, Spokane, USA, Apr. 3-7, 2017, 5 pages.

Huawei, HiSilicon, "Transmission of data during random access procedure," R1-1705121, 3GPP TSG RAN WG1 Meeting #88bis, Spokane, USA, Apr. 3-7, 2017, 2 pages.

Partial Supplementary European Search Report in European Application No. 18792170.5, dated Nov. 26, 2019, 12 pages.

3rd Generation Partnership Project; Technical Specification Group Services and System Aspects; "General Packet Radio Service (GPRS) enhancements for Evolved Universal Terrestrial Radio Access Network (E-UTRAN) access (Release 14)", 3GPP TS 23.401 V14.3.0, Mar. 2017, 386 pages.

* cited by examiner

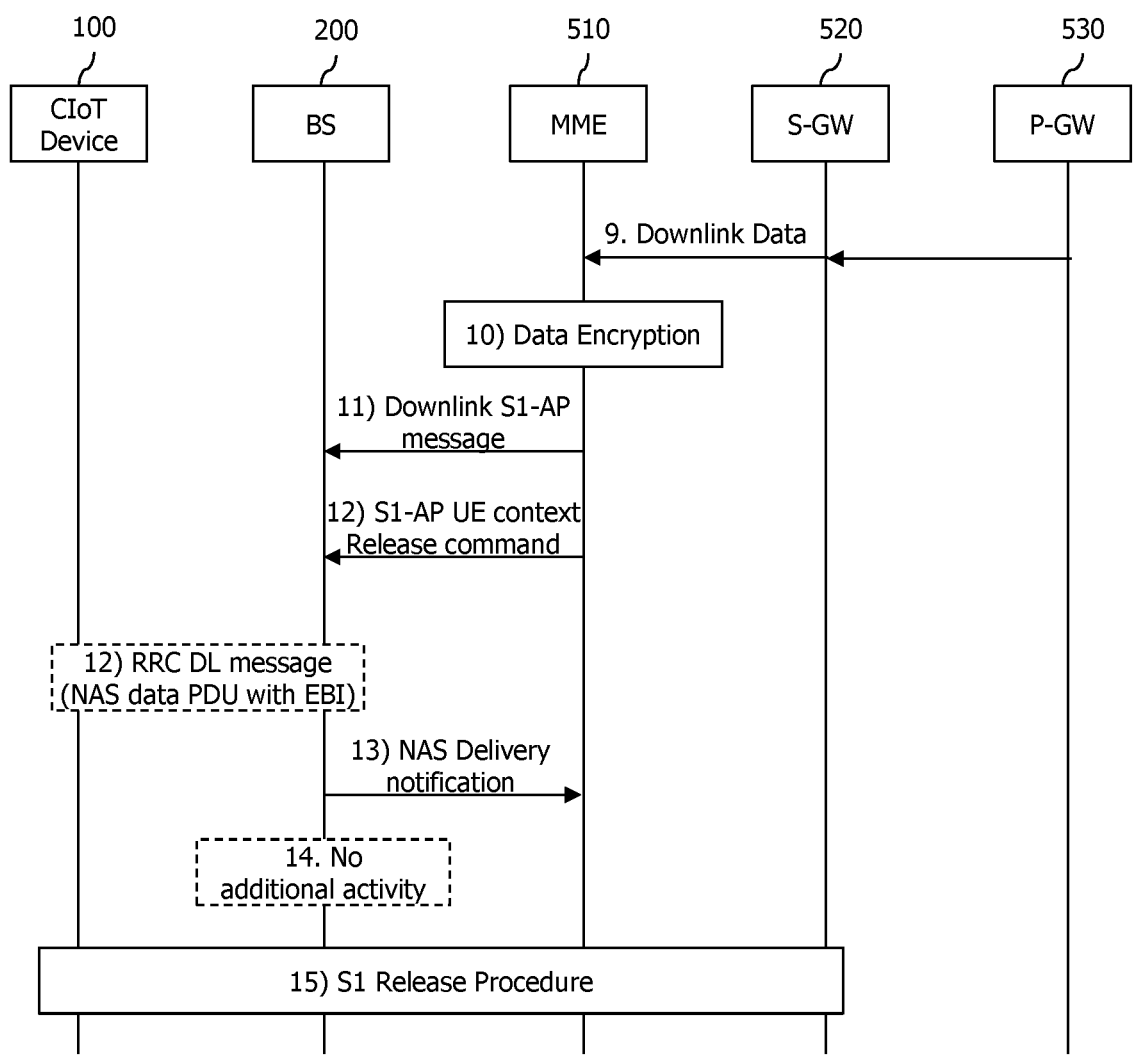

METHOD FOR TRANSMITTING DATA ACCORDING TO EDT

CROSS-REFERENCE TO RELATED APPLICATIONS

Pursuant to 35 U.S.C. § 119(e), this application is a continuation of International Application PCT/KR2018/004897, with an international filing date of Apr. 27, 2018, which claims the benefit of U.S. Provisional Patent Applications Nos. 62/491,333 filed on Apr. 28, 2017, 62/581,045 filed on Nov. 3, 2017, and Korean Patent Application No. 10-2018-0040020 filed in the Korean Intellectual Property Office on Apr. 5, 2018, the contents of which are hereby incorporated by reference herein in its entirety.

BACKGROUND OF THE INVENTION

Field of the Invention

The present invention relates to mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (the S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or the P-GW) 53 corresponds to the termination point of a data interface toward a packet data network. The PDN GW 53 can support policy enforcement features, packet filtering, charging support, etc. Furthermore, the PDN GW (or the P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are presented in the different function entities of an E-UTRAN and an EPC is called a reference point. Table 1 below defines reference points shown in FIG. 1. In addition to the reference points shown in the example of Table 1, various reference points may be presented depending on a network configuration.

TABLE 1

| Reference point | Description |
|---|---|
| S1-MME | Reference point for the control plane protocol between E-UTRAN and the MME |
| S1-U | Reference point between E-UTRAN and Serving GW for the per bearer user plane tunnelling and inter an eNodeB path switching during handover) |
| S3 | It enables user and bearer information exchange for inter 3GPP access network mobility in Idle and/or active state. This reference point can be used intra-PLMN or inter-PLMN (e.g. in the case of Inter-PLMN HO). |

TABLE 1-continued

| Reference point | Description |
|---|---|
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | A reference point between the MME and the S-GW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common the EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the transmitter side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are presented in the physical layer of the transmiter side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to transmit control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARD). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are presented in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for transmitting, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently transmit an IP packet, such as IPv4 or IPv6, in a radio section having a small bandwidth when transmitting the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is presented between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC IDLE state. The UE in the RRC_IDLE state (re)selects a cell if necessary and checks system information or paging information. This process is called camp on. When the UE in the RRC IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Meanwhile, in FIG. 3, the RRC layer, the RLC layer, the MAC layer, and the PHY layer placed under the NAS layer are also collectively called an Access Stratum (AS).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

In recent years, researches on communication between devices or devices and servers without human intervention, that is, MTC (Machine Type Communication), have been actively conducted.

MTC communication is also called IoT (Internet of Things) communication because there is no human intervention. Performing IoT communication based on cellular network rather than wireless LAN like Wi-Fi is called CIoT. Unlike wireless LAN, CIoT supports communication which is not based on IP as well as IP-based communication.

Meanwhile, in order to support the CIoT service, the 3GPP has improved the physical layer, i.e., RAT (Radio Access Technology). The improved RAT is called NB-IoT (Narrowband-IoT).

Thus, CIoT devices using NB-IoT are expected to transmit and receive a small amount of data. However, in order for the CIoT device to transmit and receive data, it should transmit and receive a considerable number of signals with the base station in advance. In order to transmit/receive such a small amount of data, it may be inefficient to transmit/receive a large number of control signals in advance.

In order to solve these problems, attempts have been made to optimize the CIoT using a control plane (CP) in an evolved packet service (EPS) and to optimize it using a user plane (UP).

On the other hand, in recent years, there has been a debate to transmit data more quickly. This is called EDT (Early Data Transmission).

However, it has been technically impossible to apply EPS optimization method and EDT together.

SUMMARY OF THE INVENTION

Accordingly, one disclosure of this specification is to propose a scheme capable of solving the aforementioned problems.

In order to solve the aforementioned aim, one disclosure of the present specification provides a method for supporting an Early Data Transmission (EDT). The method may be performed by a base station and comprise: receiving, by the base station and from a Mobility Management Entity (MME), a first non-access-stratum (NAS) message. The first NAS message may include a downlink data. The method may comprise: considering that there is no further data beside the downlink data, in response to the reception of the first NAS message.

The method may further comprise: transmitting, by the base station, an Initial User Equipment (UE) message to the MME. The initial UE message may include UE's data according to the EDT.

The first NAS message may include a downlink NAS transport message.

The method may further include transmitting, by the base station, a UE context resume request message to the MME.

In order to solve the aforementioned aim, one disclosure of the present specification provides a method for transmitting, by a wireless device including a radio resource control (RRC) layer and an upper layer, a uplink data according to an Early Data Transmission (EDT). The method may include: obtaining a Release Assistance Indication (RAI) from the upper layer; determining whether application of the EDT is possible based on the RAI; and transmitting a RRC request message including the UL data if it is determined that the application of the EDT is possible.

The obtaining of the RAI may include further obtaining a RRC establishment cause and a call type.

The RRC request message including the UL data may be transmitted through a third message of a random access procedure.

The RRC request message may include at least one of an EPS bearer ID and a Logical Channel (LC) ID.

The RAI may indicate that a following uplink data is not expected or only one downlink data for the uplink data is expected.

The RRC request message may include a RRC connection resume request message.

A RRC connection resume procedure may not be performed if the uplink data is transmitted through a control plane (CP).

The RRC request message may be a message other than the RRC connection resume request message if the uplink data is transmitted through the control plane.

In order to solve the aforementioned aim, one disclosure of the present specification provides a method for transmitting, by a wireless device including a radio resource control (RRC) layer, a uplink data according to an Early Data Transmission (EDT). The method may include: transmitting a third message of a random access procedure to a base station; and receiving a fourth message of the random access procedure from the base station. The third message may include an RRC connection resume request message for performing a RRC connection resume procedure in an RRC suspend state. The RRC connection resume request message may include the uplink data according to the EDT.

The fourth message may include a downlink data.

The fourth message may include at least one of a RRC connection resume message, a RRC connection setup message and a RRC connection reject message.

In order to solve the aforementioned aim, one disclosure of the present specification provides a wireless device for transmitting uplink data according to an Early Data Transmission (EDT). The wireless device may include a transmission/reception unit; and a processor which controls the transmission/reception unit and includes a Radio Resource Control (RRC) layer and an upper layer. If obtaining a Release Assistance Indication (RAI) from the upper layer, the RRC layer may determine whether application of the EDT is possible based on the RAI. If it is determined that the application of the EDT is possible, the RRC layer of the processor may transmits a RRC request message including the uplink data.

According to the disclosure of the present specification, the problems of the above-described prior art are solved. Specifically, the disclosure of the present specification allows a CIoT device to perform EDT (Early Data Transmission) to thereby save power.

BRIEF DESCRIPTION OF THE DRAWINGS

FIGS. 10A and 10*b* illustrate a procedure for transmitting data by a CIoT device according to a control plane (CP) CIoT EPS optimization.

DESCRIPTION OF EXEMPLARY EMBODIMENTS

Figure 1:
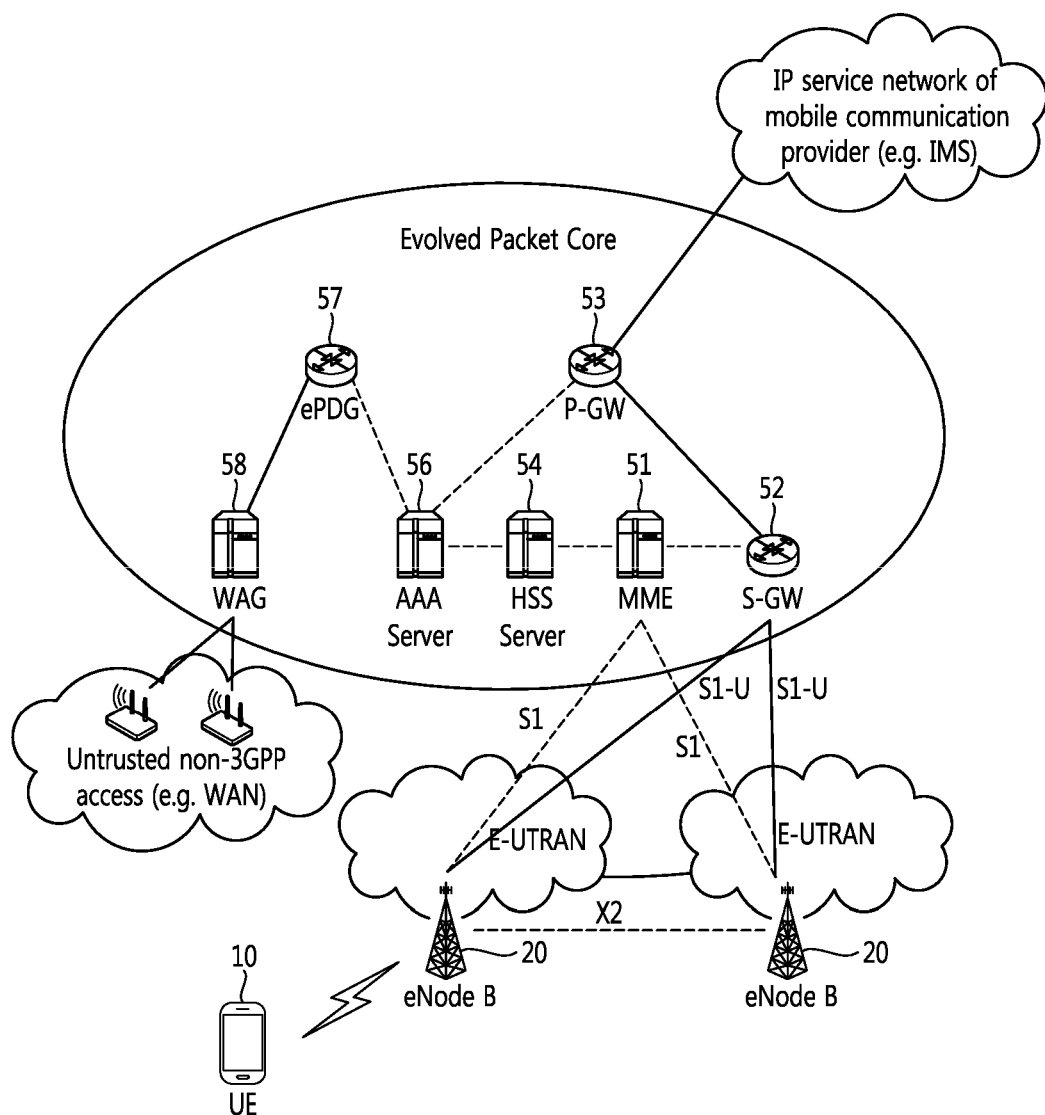
FIG. 1 is a structural diagram of an evolved mobile communication network.
Figure 2:
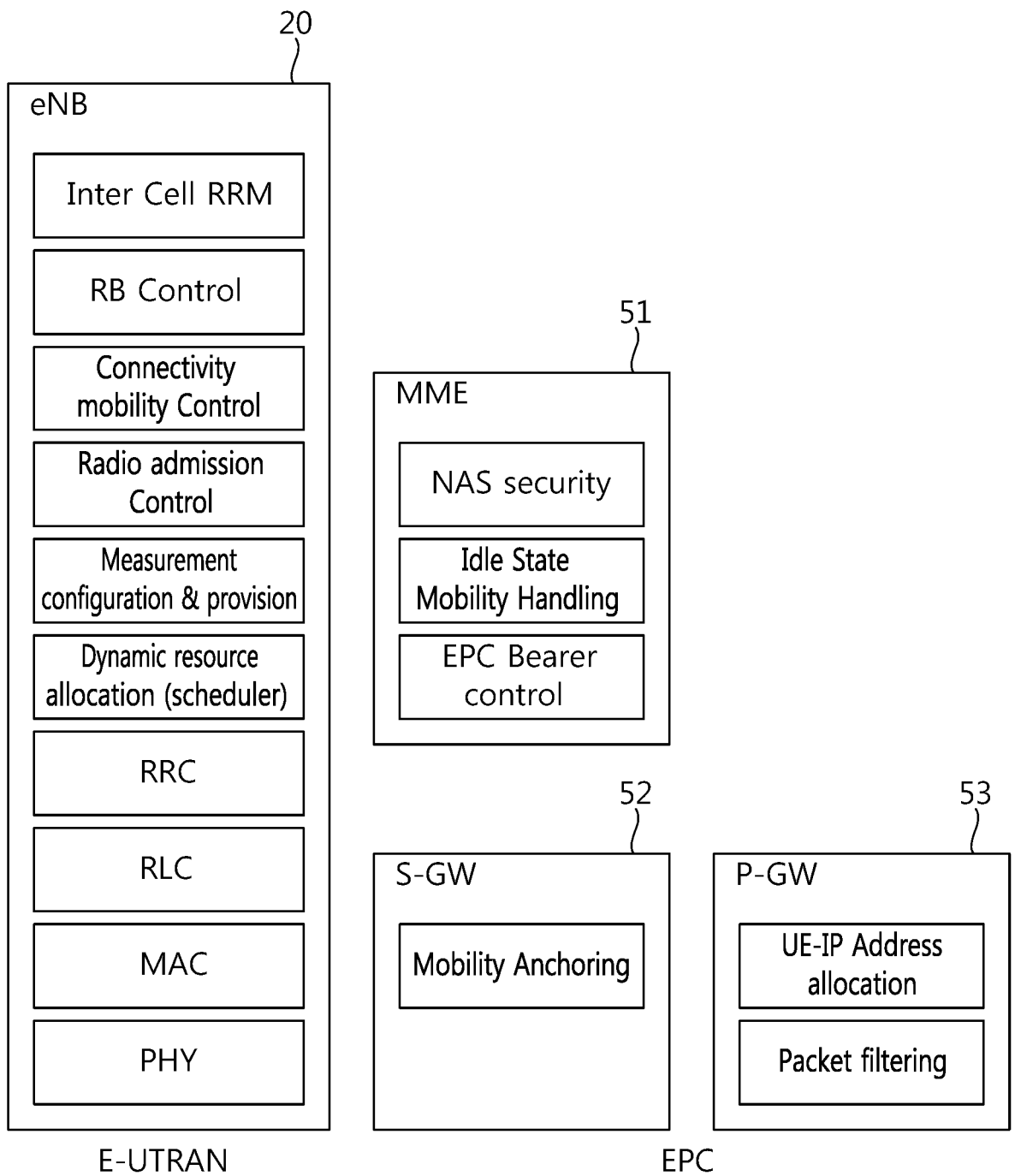
FIG. 2 is an exemplary diagram illustrating architectures of a general E-UTRAN and a general EPC.
Figure 3:
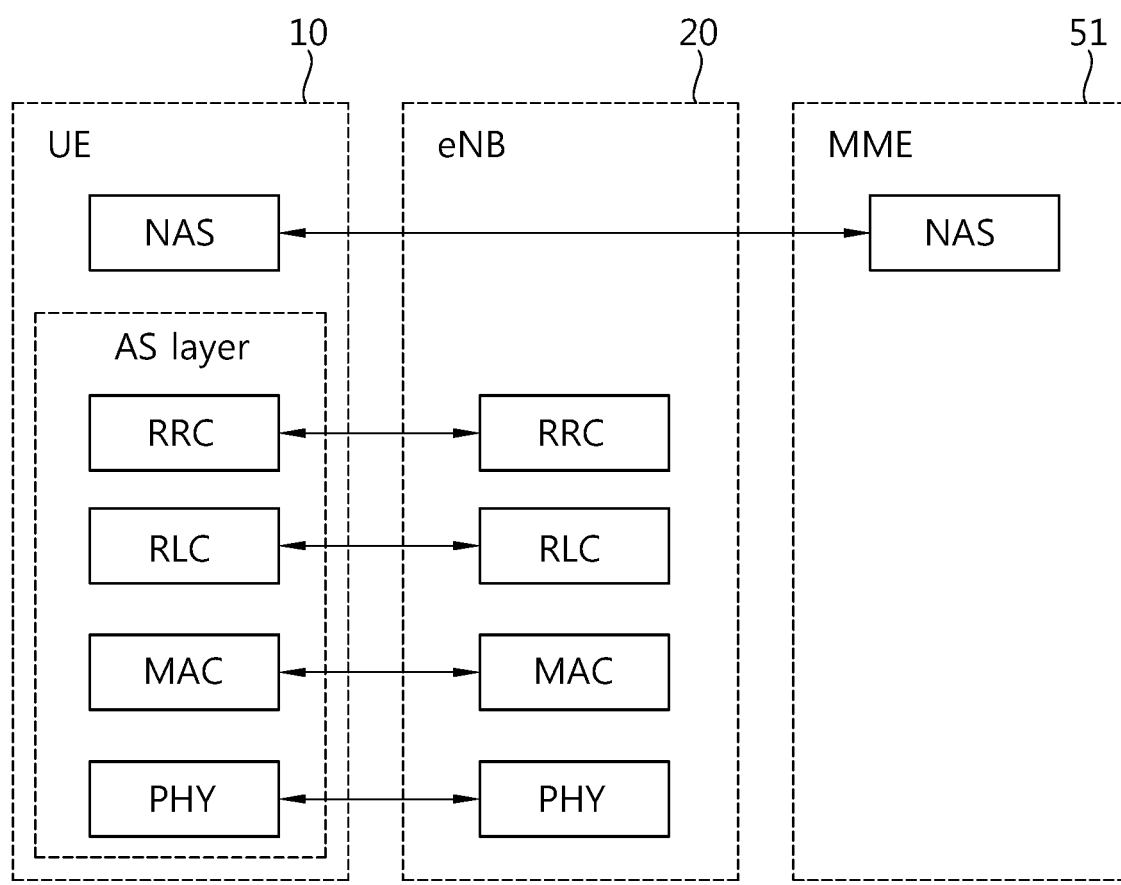
FIG. 3 is an exemplary diagram illustrating a structure of a radio interface protocol on a control plane between UE and eNodeB.
Figure 4:
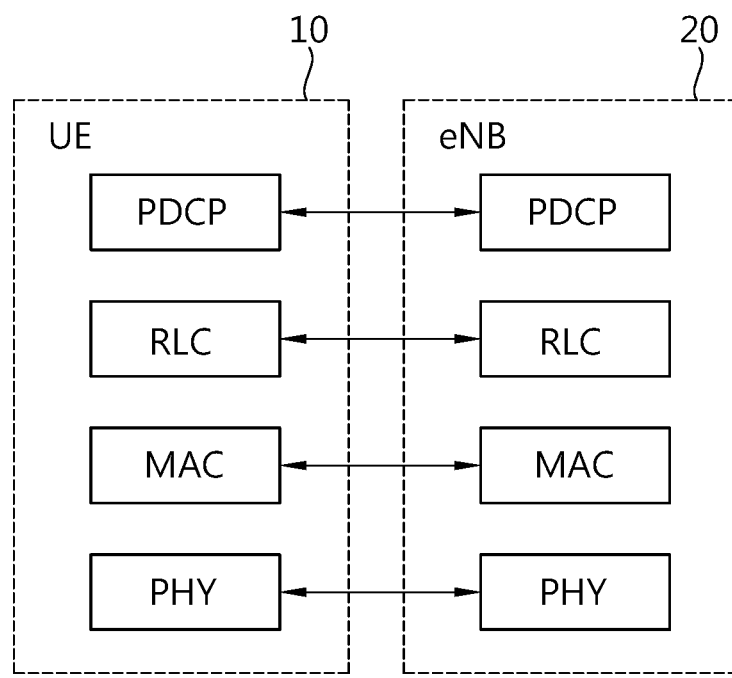
FIG. 4 is another exemplary diagram illustrating a structure of a radio interface protocol on a user plane between the UE and a base station.
Figure 5A:
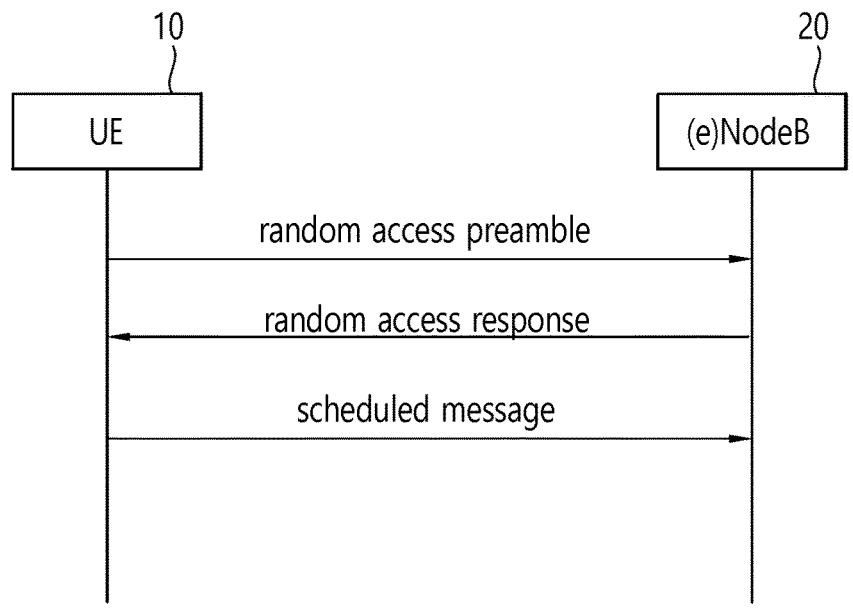
FIG. 5*a* is a flowchart illustrating a random access process in 3GPP LTE.
Figure 5B:
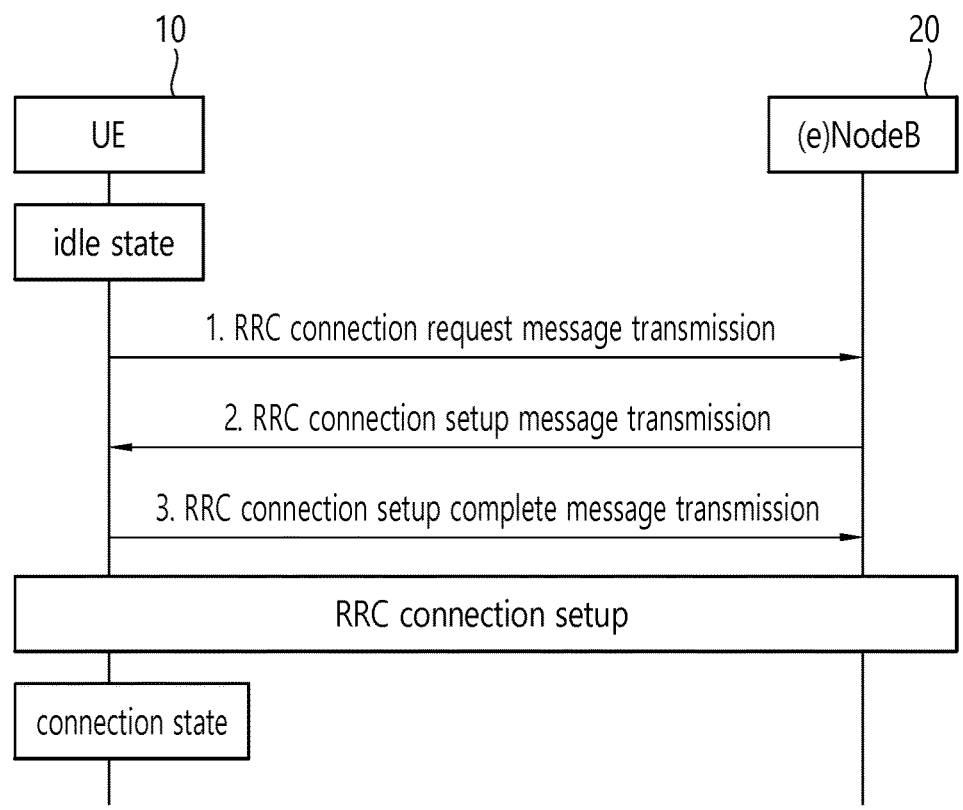
FIG. 5*b* illustrates a connection process in a radio resource control (RRC) layer.

The presented invention is described in light of UMTS (Universal Mobile Telecommunication System) and the EPC (Evolved Packet Core), but not limited to such communication systems, and may be rather applicable to all communication systems and methods to which the technical spirit of the presented invention may apply.

The technical terms used herein are used to merely describe specific embodiments and should not be construed as limiting the presented invention. Further, the technical terms used herein should be, unless defined otherwise, interpreted as having meanings generally understood by those skilled in the art but not too broadly or too narrowly. Further, the technical terms used herein, which are determined not to exactly represented the spirit of the invention, should be replaced by or understood by such technical terms as being able to be exactly understood by those skilled in the art. Further, the general terms used herein should be interpreted in the context as defined in the dictionary, but not in an excessively narrowed manner.

Furthermore, the expression of the singular number in the specification includes the meaning of the plural number unless the meaning of the singular number is definitely different from that of the plural number in the context. In the following description, the term 'include' or 'have' may represented the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the presented invention.

It will be understood that when an element or layer is referred to as being "connected to" or "coupled to" another element or layer, it can be directly connected or coupled to the other element or layer or intervening elements or layers may be presented. In contrast, when an element is referred to as being "directly connected to" or "directly coupled to" another element or layer, there are no intervening elements or layers presented.

Hereinafter, exemplary embodiments of the presented invention will be described in greater detail with reference to the accompanying drawings. In describing the presented invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smart phone, a multimedia device, or other portable device or may be a stationary device, such as a PC or a car-mounted device.

Definition of Terms

For better understanding, the terms used herein are briefly defined before going to the detailed description of the invention with reference to the accompanying drawings.

An UMTS is an abbreviation of a Universal Mobile Telecommunication System, and it refers to the core network of the 3rd generation mobile communication.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF): The node of an EPS network which performs a policy decision for dynamically applying QoS and a billing policy that are different for each service flow.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A Tunnel Endpoint Identifier (TEID): The end point ID of a tunnel set between nodes within a network, and it is set for each bearer unit of each UE.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

OMA DM (Open Mobile Alliance Device Management): a protocol designed for managing mobile devices such as mobile phones, PDAs, or portable computers and performs functions such as device configuration, firmware upgrade, and error reporting.

OAM (Operation Administration and Maintenance): denotes a group of network management functions displaying network faults and providing capability information, diagnosis and data.

NAS configuration MO (Management Object): MO (Management Object) used to configure in UE parameter associated with NAS functionality NAS (Non-Access-Stratum): A higher stratum of a control plane between a UE and an MME. The NAS supports mobility management, session management, IP address management, etc., between the UE and the network.

MM (Mobility Management) Operation/Procedure: An operation or procedure for controlling/managing/controlling mobility of UE. The MM operation/procedure can be interpreted to include one or more of the MM operation/procedure in the CS network, the GMM operation/procedure in the GPRS network, and the EMM operation/procedure in the EPS network. The UE and network nodes (MME, SGSN, MSC) send and receive MM messages to perform MM operations/procedures.

SM (Session Management) Operation/Procedure: An operation or procedure for controlling/managing/processing/handling the UE's user plane and/or bearer context/PDP context. The SM operation/procedure may be interpreted to include one or more of the SM operation/procedure in the GPRS network and the ESM operation/procedure in the EPS network. The UE and the network nodes (MME, SGSN) send and receive SM messages to perform SM operations/procedures.

PLMN: Acronym for public land mobile network, which means the network identification number of the operator. In the UE roaming situation, the PLMN is divided into Home PLMN (HPLMN) and Visited PLMN (VPLMN).

CIoT: Abbreviation for Cellular Internet of Things, which means to perform based on IoT communication.

Narrowband-IoT: It means RAT (Radio Access Technology) improved in 3GPP, for CIoT. That is, it is a network operating at a maximum bandwidth of 180 kHz (corresponding to one PRB).

Control plane CIoT EPS optimization: signaling optimization on the control plane to enable efficient transmission of user data (IP based or non-IP based or SMS based user data)

User plane CIoT EPS optimization: Optimization of signaling on the user plane enabling efficient transmission of user data (IP based or non-IP based or SMS based user data)

UEs supporting CIoT EPS optimization: UEs supporting control plane CIoT EPS optimization or user plane CIOT EPS optimization and one or more other CIoT EPS optimizations NB-S1 mode: It means a mode that operates with improved RAT (radio access technology) for NB (Narrowband) IoT.

WB-S1 mode: This mode is not a modified RAT for NB IoT but a general RAT mode.

Hereinafter, the disclosure of the present specification will be described with reference to the drawings.

<Machine Type Communication (MTC) Communication>

MTC (Machine Type Communication) means communication between a machine and a machine, excluding people, and the machine used at this time is called an MTC machine. The services provided through the MTC device are different from those of the human intervention, and can be applied to various categories of services.

Figure 6:
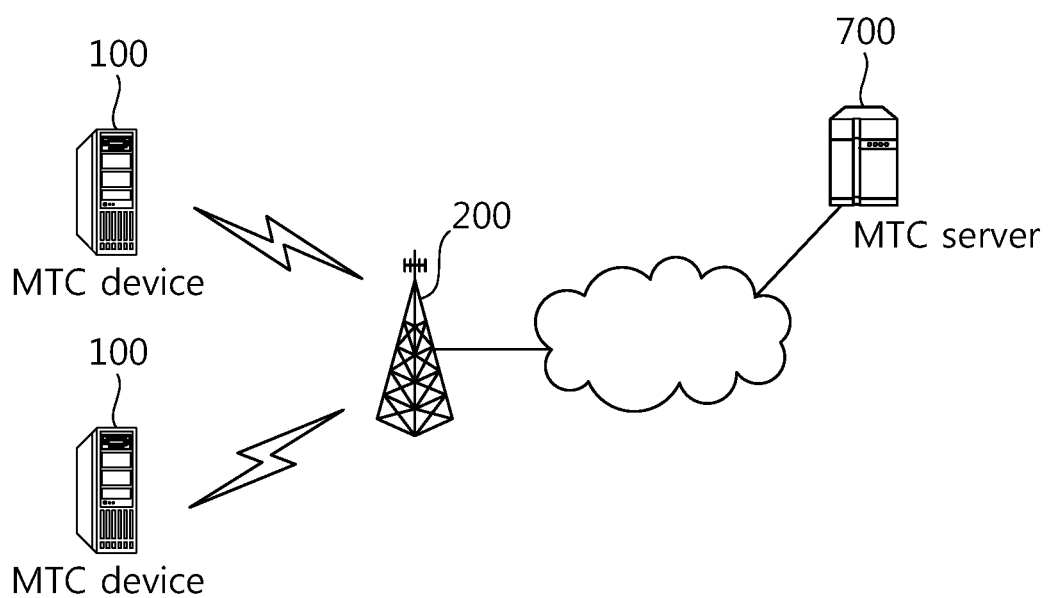
FIG. 6 shows an example of MTC (Machine Type Communication) communication.

FIG. 6 shows an example of MTC (Machine Type Communication) communication.

The MTC (Machine Type Communication) is an information exchange between the MTC apparatuses 100 not involving human interaction through the base station 200 or between the MTC apparatus 100 and the MTC server 700 via the base station Exchange.

The MTC server 700 is an entity that communicates with the MTC device 100. The MTC server 700 executes the MTC application and provides the MTC specific service to the MTC device.

The MTC device 100 is a wireless device that provides MTC communication, and may be fixed or mobile.

<Power Saving Mode (PSM)>

Meanwhile, due to the characteristics of the MTC device, instead of receiving mobile terminating data not frequently, the mobile originating data can be periodically transmitted. Given these characteristics, in order to maximize energy efficiency, the MTC device can operate in a power saving mode (PSM).

When entering the PSM state, the MTC device deactivates the access stratum (AS), so the PSM is similar to the power off state. However, in the PSM state, the MTC device may exist in the registered state in the network, and thus it becomes unnecessary for the MTC device to be re-attached to the network and to re-establish the PDN connection. As such, the PSM state and the power-off state are differentiated.

Once the MTC device enters the PSM state, for example, until a periodic TAU/RAU or mobile originated event such as the generation or detachment of uplink data may cause the MTC device to initiate certain procedures in the network, it will remain in the PSM state.

Even if the MTC device is in the PSM state, it can leave the PSM at any time when a mobile originating service is needed. That is, even in the PSM state, the MTC device may activate the access layer (AS) at any time for a mobile originated service and resume operation of the idle mode.

On the other hand, if the mobile reachable timer has expired and the activation time of the MTC device has expired, the MME can know that the MTC device has entered the PSM state and therefore cannot be paged.

On the other hand, once the MTC device enters the PSM state, it cannot immediately receive a mobile terminating service. In other words, if the MTC device enters the PSM state, a response can be made to the mobile terminating service only during an active time period after a mobile originated event such as a signal transmission or data transmission after a periodic tracking area update (TAU) or a routing area update (RAU).

Therefore, PSM is suitable only for MTC devices requiring non-frequent mobile originating service and mobile terminating service and capable of tolerating a certain latency in communication.

On the other hand, the MTC device should request an activation time long enough to enable reception of data such as a potential mobile terminated service or SMS.

If the MTC device wishes to use the PSM, the MTC device should request a value of active time during every attachment and TAU/RAU procedure. If the network supports PSM and the MTC device accepts the use of the PSM, the value of the active time is allocated to the MTC device. The network may determine an active time value to be allocated to the MTC device in consideration of the active time value requested by the MTC device and the MME/SGSN setting. If the value of the active time allocated by the network is unsatisfactory, the MTC device may request a value of its desired active time only during the period of the next coming TAU/RAU procedure.

In addition, the MTC device to which the PSM is applicable may attach a periodic TAU/RAU timer value suitable for latency/responsiveness to the mobile terminated services and request the periodic TAU/RAU timer value to the network during the TAU/RAU procedure. When the network allocates a periodic TAU/RAU timer value to the MTC device, if the MTC device is not satisfied with the allocated periodic TAU/RAU timer value, then the MTC device can request its desired periodic TAU/RAU timer value only during the period of the next coming TAU/RAU procedure.

<Cellular Internet of Things (CIoT)>Communication>

MTC communication is also called IoT (Internet of Things) communication because there is no human intervention. Performing IoT communication based on cellular network rather than wireless LAN like Wi-Fi is called CIoT. Unlike wireless LAN, CIoT supports non-IP based communication as well as IP based communication.

Meanwhile, in order to support the CIoT service, 3GPP has improved the physical layer, that is, RAT (Radio Access Technology). The improved RAT is called NB-IoT (Narrowband-IoT).

The RAT improved for the NB-IoT uses an optimized physical layer (e.g., a carrier bandwidth of 180 kHz and a subcarrier spacing of 3.75 kHz or 15 kHz) for very low power consumption.

<Optimization for Data Transmission and Reception of CIoT Devices>

Since the CIoT device transmits and receives a small amount of data, as described above, the CIoT device can operate in a network operating with an improved RAT for NB-IoT, that is, a bandwidth of up to 180 kHz (corresponding to one PRB).

However, even if the CIoT device transmits/receives a small amount of data, since the CIoT device should transmit and receive a large amount of signaling with the network in advance, there is a problem of inefficiency. This will be described with reference to FIG. 7.

Figure 7:
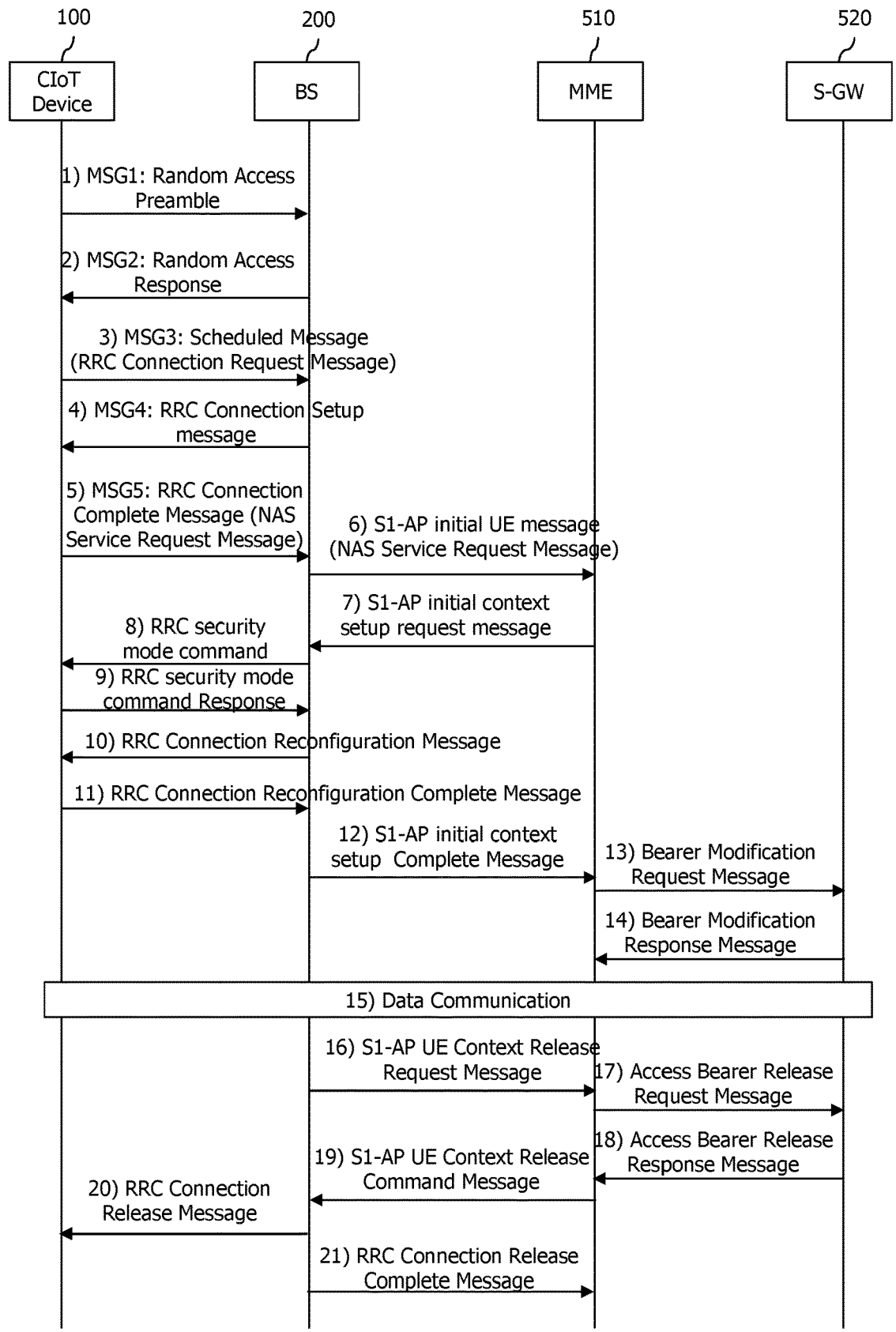
FIG. 7 shows a series of procedures performed by a CIoT device for data communication.

FIG. 7 shows a series of procedures that the CIoT device performs for data communication.

Hereinafter, the procedures will be described in order with reference to FIG. 7.

1 to 5) First, the CIoT device 100 performs a random access procedure for data communication. That is, the CIoT device 100 transmits a first message (MSG1), e.g., a random access preamble, to the base station 200. Then, the CIoT device 100 receives a second message (MSG2), for example, a random access response message from the base station 200. Then, the CIoT device 100 transmits a third message (MSG3), for example, a scheduled message to the base station 200. The scheduled message may include an RRC Connection Request message. Then, the CIoT device 100 receives a fourth message (MSG4), for example, an RRC Connection Setup message from the base station 200. Then, the CIoT device 100 transmits a fifth message (MSG5), for example, an RRC Connection Complete message to the base station 200. The RRC connection complete message may include a NAS service request message.

6 to 7) Then, the base station 200 transmits an initial UE (Initial UE) message based on the S1-AP to the MME 510. The initial UE message may include the NAS service request message. The MME 510 transmits an Initial Context Setup Request message based on the S1-AP to the base station 200.

8 to 9) Then, the base station 200 transmits an RRC Security Mode Command (SMC) to the CIoT device and receives an RRC security mode command response.

10 to 11) Thereafter, the base station 200 transmits an RRC Connection Reconfiguration Complete message to the CIoT 100. The CIoT 100 transmits an RRC Connection Reconfiguration Complete message to the base station.

12 to 14) The base station 200 transmits an Initial Context Setup Complete message based on the S1-AP to the MME 510. Then, the MME 510 transmits a bearer modification request message to the S-GW 520 and receives a bearer modification response message from the S-GW 520.

15), the CIoT device 100 can perform data communication.

16 to 19) When the data communication is completed and the RRC connection is not needed, the base station 200 transmits a UE context release request message based on the S1-AP to the MME 510. Then, the MME 510 transmits a release access bearer message to the S-GW 520. Then, the S-GW 510 delivers a Release Access Bearer Response message to the MME 510. The MME 510 transmits a UE Context Release Command message based on the S1-AP to the base station.

20) The base station 200 transmits an RRC Connection Release message to the UE and transmits an RRC Connection Release Complete message to the MME 510.

As described above, even if the CIoT device 100 transmits/receives a small amount of data, since the CIoT device 100 should exchange a large number of signals with the base station 200, there is a problem of inefficiency.

In particular, the CIoT device is expected to be located at a fairly high density within the coverage of the base station, in which case a fairly large number of signals can overload the network.

Therefore, there are attempts to optimize the CIoT by using the control plane in the evolved packet service (EPS) and by using the user plane. Each will be described as follows.

1. Suspend and Resume Procedures for EPS Optimization 1-1. Suspend Procedure

This procedure is used by the network to suspend the connection when the UE and the network support user plane CI-optimized EPS optimization.

Figure 8:
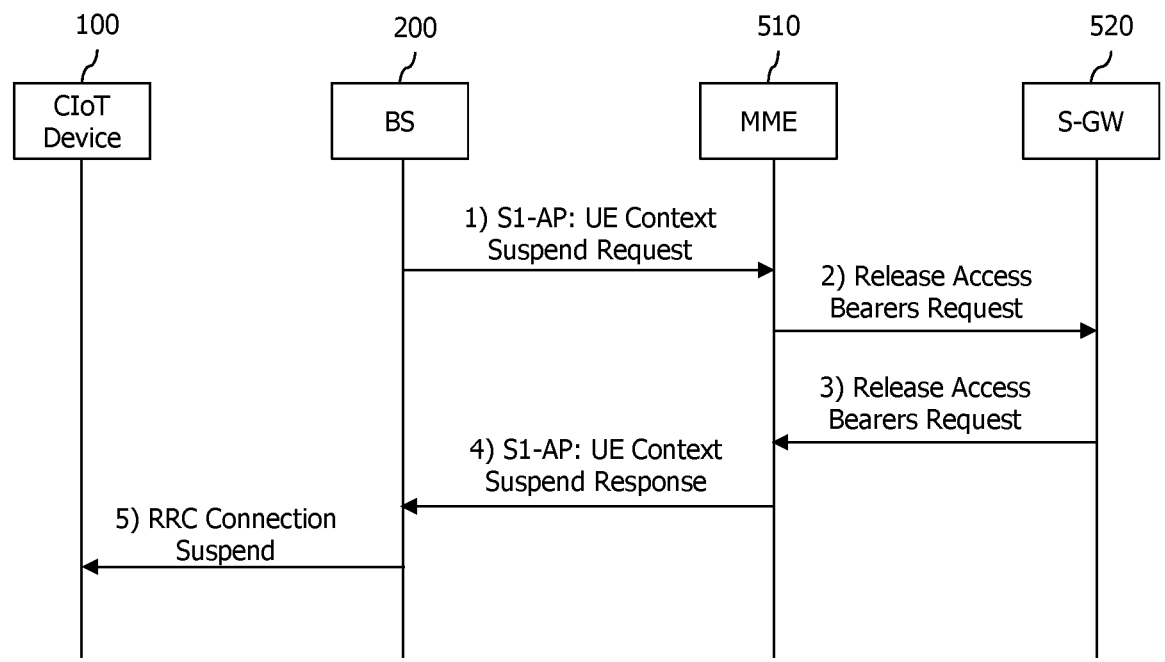
FIG. 8 is a signal flow diagram illustrating a suspend procedure initiated by a base station.

FIG. 8 is a signal flow diagram illustrating a suspend procedure initiated by a base station.

1) The base station transmits a S1 UE Context Suspend Request message to the MME to initiate a connection suspend procedure. Specifically, the base station suspends the RRC connection of the CIoT device and instructs the MME to enter the ECM-IDLE. The data associated with the S1-AP association, UE context and bearer context needed to resume the connection is maintained in the base station, the CIoT device and the MME.

The base station may include information on a recommended cell and a base station for paging in the S1 UE Context Suspend Request message. When available, the MME should store this information when it is used when paging the CIoT device.

The base station includes information on enhanced (i.e., extended) coverage, if possible, in the S1 UE Context Suspend Request message.

2) The MME sends a release bearer request message to the Serving GW requesting release of all S1-U bearers for the CIoT device.

3) The S-GW releases all base station related information (address and downlink TEID) for the CIoT device and responds with a Release Bearer Access Response message to the MME. When a downlink packet for the CIoT device arrives, the S-GW starts to buffer the received downlink packet for the CIoT device and starts the network trigger service request procedure.

The S-GW informs the MME of the release of the S1-U bearer via a release access bearer response message.

4) The MME sends an S1-AP: UE Context Suspend Response message to the base station to successfully terminate the connection suspension procedure initiated by the base station. See TS 36.413 [36].

5) The base station suspends the RRC connection to the CIoT device by sending an RRC connection suspension message.

When the AS layer of the CIoT device receives the RRC connection suspension message, it sends an indication indicating that the RRC connection is suspended, to the NAS layer.

When receiving the indication, the NAS layer of the CIoT device enters the EMM idle state. The NAS layer considers that the NAS signaling connection is released. However, the NAS layer does not consider that the secure exchange of NAS messages has been terminated.

1-2. Resume Procedure

This procedure is used to resume ECM connections by CIoT devices when the CIoT device and network support user plane CIoT EPS optimization and the CIoT device stores the information needed to perform the connection resumption procedure. Specifically, the procedure is as follows.

If the procedure for using the NAS message is initiated while the EMM is idle based on the suspend indication, the NAS layer of the CIoT device requests the AS layer to resume the RRC connection. To this end, the NAS layer transmits an establishment cause and a call type to the AS layer. At this time, the NAS message is not yet transmitted to the AS layer.

When receiving an indication from the AS layer indicating that the RRC connection is resumed, the NAS layer enters an EMM connection state. If the NAS message, which is not transmitted to the AS layer and is waiting, is a service request message, a control plane service request (CPSR) message, or an extended service request message, the message is not delivered. If the NAS message is another message, the NAS layer encrypts the message. After the NAS layer enters the EMM connection state, the NAS layer transmits the message.

Figure 9:
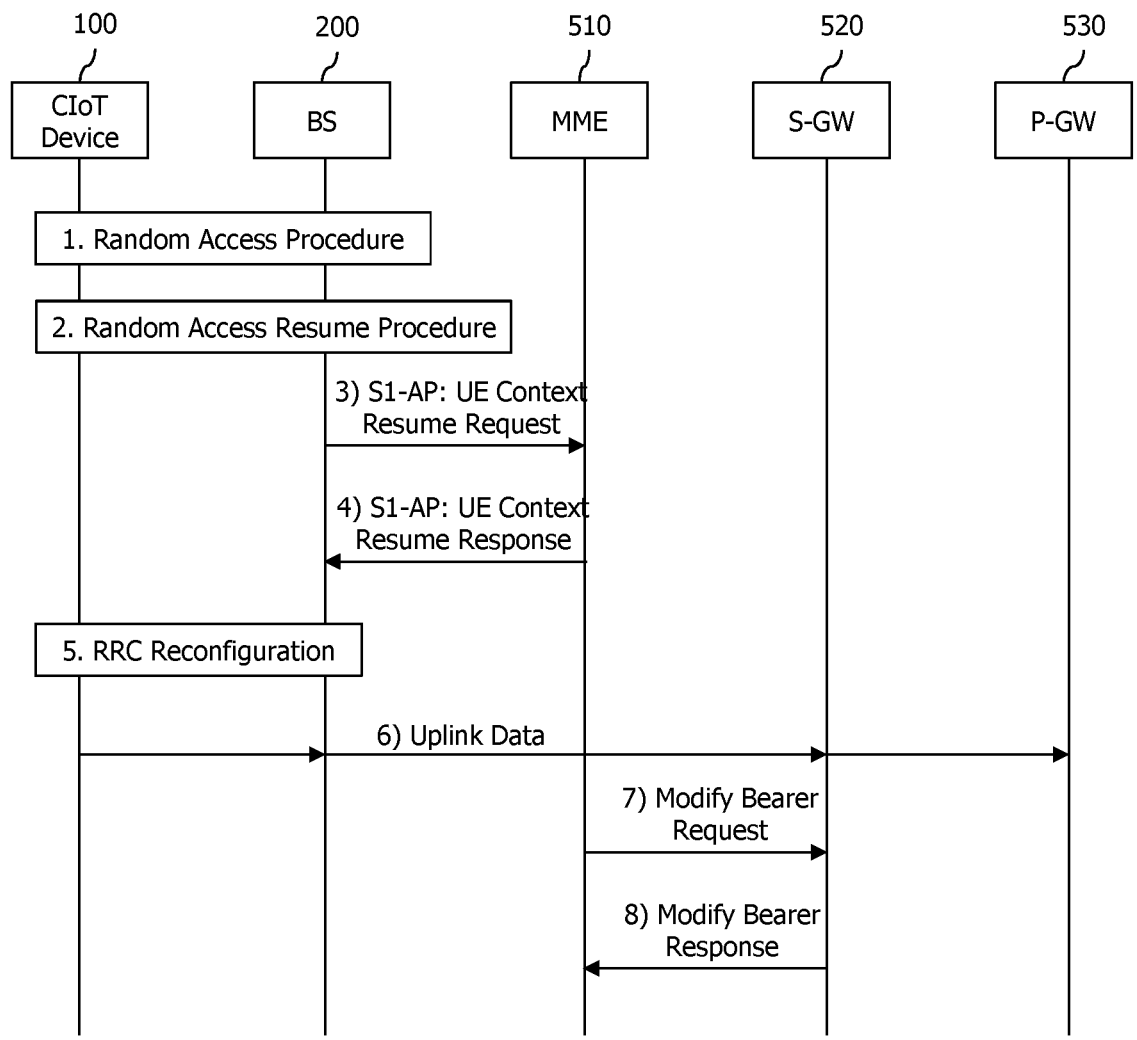
FIG. 9 is a signal flow diagram illustrating a connection resuming procedure initiated by a CIoT device.

FIG. 9 is a signal flow diagram illustrating a connection resumption procedure initiated by the CIoT device.

1) The CIoT device initiates a random access procedure for the base station

2) The CIoT device triggers an RRC connection resumption procedure that contains information needed by the base station to access the AS context stored for the CIoT device. The E-UTRAN performs a security check. EPS bearer state synchronization is performed between the CIoT device and the network. That is, if no radio bearer for the basic EPS bearer is set, the radio bearer is not set in the CIoT device, and the CIoT internally removes the EPS bearer, not the control plane CIoT EPS bearer.

3) The base station informs the MME that the RRC connection of the CIoT device has been resumed through the S1-AP UE context resume request message including the RRC resume cause. If the base station cannot accept all suspendd bearers, the base station should include information about this fact in the rejected EPS bearer list. The MME enters the ECM-CONNECTED state. The MME confirms that the UE has returned to the base station associated with the MME storing data related to the S1-AP association, the UE context, and the bearer context.

If the default bearer is not accepted by the base station, then all bearers associated with the bearer are treated as non-accept bearers. The MME releases the non-accept and non-set bearers by triggering the bearer release procedure.

4) The MME responds to the connection resumption via the S1-AP UE Context Resume Response message.

5) If the list of E-RABs cannot be resumed, the base station resets the radio bearer.

6) The UL (uplink) data transmitted by the CIoT device can now be forwarded by the base station to the S-GW. The base station transmits UL data to the stored S-GW address and TEID during the connection suspend procedure. The S-GW transmits the UL data to the PDN GW.

7) The MME sends a Modify Bearer Request message. The Modify Bearer Request message may include information on an address of the EPS bearer, an S1 TEID, a request for a downlink packet delay notification, a RAT type, and the like.

8) The S-GW sends a Modify Bearer Response message. The message includes the address of the S-GW, TEID.

2. Control Plane (CP) CIoT EPS Optimization

This is a method of transmitting data by including data in a PDU (Packet Data Unit) of the NAS layer. That is, when the CIoT device and the MME use the control plane CIoT EPS optimization, the CIoT device and the MME can transmit data to the NAS PDU including the EPS bearer ID of the associated PDN connection. This is a scheme of transmitting data through a control plane (SRB+S1-AP) for transmitting NAS messages such as Attach of the NAS layer and Tracking Area Update (TAU) without using the user plane setup (DRB+S1-U path) which is necessary for transmission of the existing data. At this time, the security of the data uses the security of the NAS layer instead of the security of the AS layer. As described above, since the security of the AS layer is unnecessary, the SMC (Security mode command) procedure and the like can be omitted. Also, the required RRC signaling is reduced when switching the RRC connection mode.

This will be described with reference to the drawings.

Figure 10A:
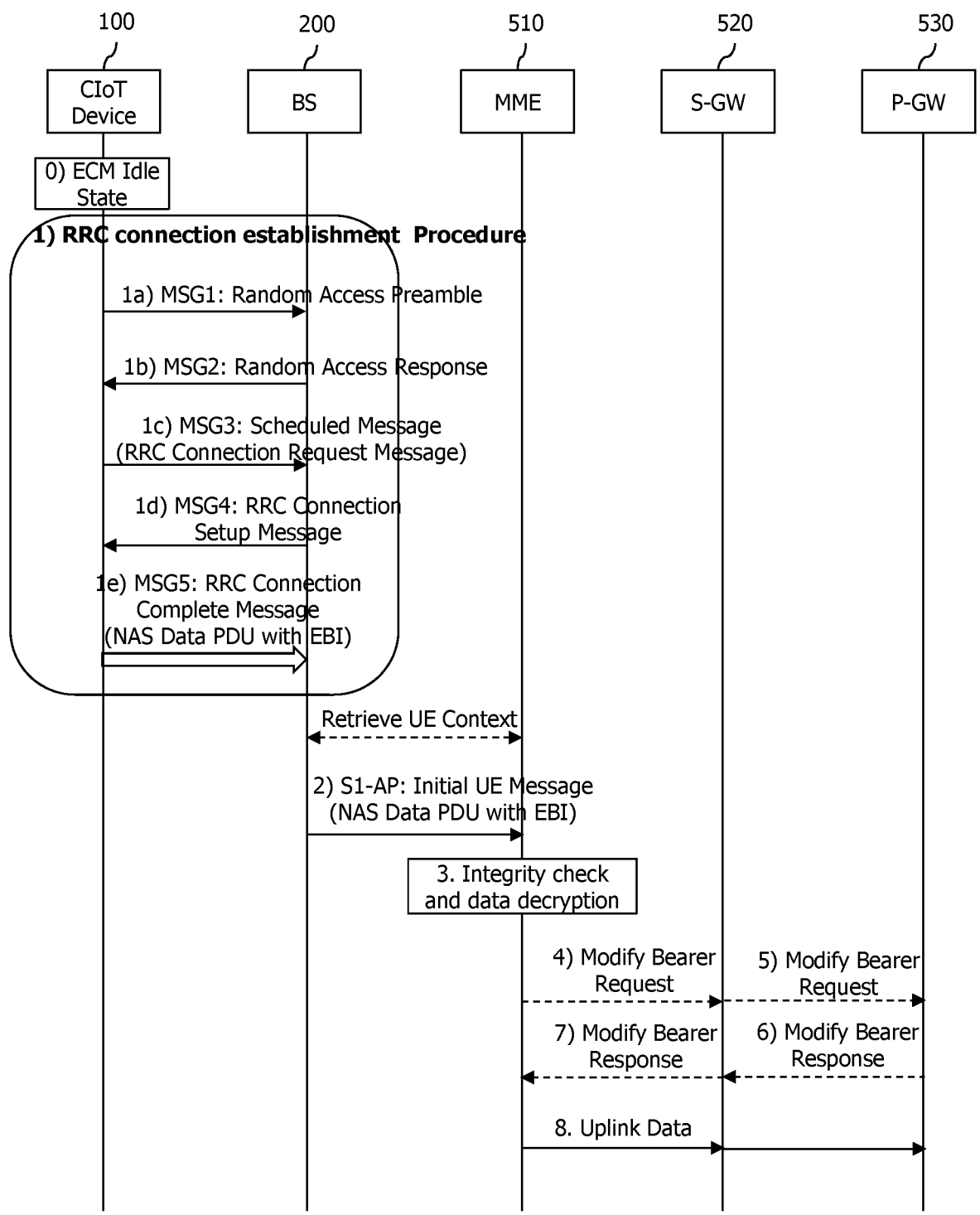

FIGS. 10a and 10b illustrate a procedure by which a CIoT device transmits data according to a control plane (CP) CIoT EPS optimization.

As can be seen with reference to FIGS. 10a and 10b, the CIoT device 100 can include data in the NAS service request message included in the fifth message (MSG5) of the random access procedure, for example, the RRC connection completion message so as then to be transmitted.

Namely, if FIG. 7 is compared with FIG. 10a, in FIG. 7, the CIoT device 100 is inefficient because it can transmit data in the 15th process. However, in FIG. 10a, the CIoT device 100 became efficient because it can transmit data in the 5th process.

3. User Plane (UP) CIoT EPS Optimization

In this case, when there is no data transmission/reception, the corresponding context is set to be maintained instead of releasing (deleting) the UE context stored in the CIoT device and the base station (i.e., the ID (or UE ID) of the CIoT device, the AS security information, etc.). Further, if there is no data transmission/reception, the CIoT device performs an RRC connection Suspend procedure instead of performing the S1 release procedure. Therefore, when the CIoT device requests the RRC connection again, it can quickly switch from the RRC idle mode to the RRC connection mode. That is, instead of performing the service request procedure for setting up the user plane, an RRC connection resume procedure is performed. Therefore, the number of RRC signals that the CIoT device should transmit/receive to switch from the RRC idle mode (EMM-IDLE) to the RRC connection mode (EMM-CONNECTED) is significantly reduced.

Figure 11:
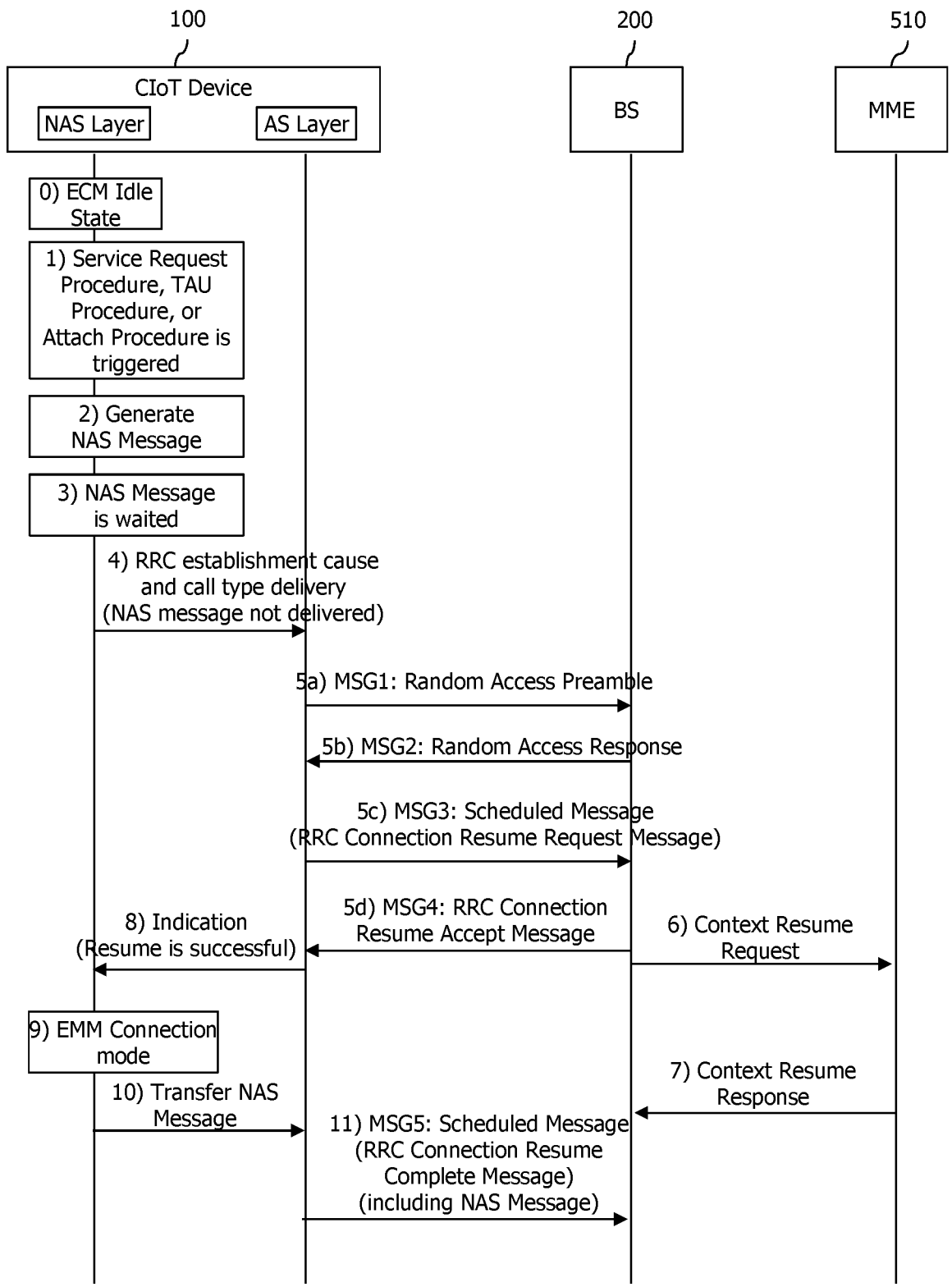
FIG. 11 shows a procedure in which a CIoT device transmits data according to a user plane (UP) CIoT EPS optimization.

FIG. 11 shows a procedure in which a CIoT device transmits data according to a user plane (UP) CIoT EPS optimization.

0) First, if there is no data transmission/reception, instead of releasing (deleting) the UE context stored in the CIoT device 100 and the base station 200, the corresponding context was maintained, and instead of performing the S1 release procedure, the RRC connection suspend procedure was performed. This causes the NAS layer to enter the ECM idle state.

1 to 3), if the data communication is again required, the NAS layer of the CIoT device 100 triggers a service request procedure, a TAU procedure, or an attach procedure. Then, the NAS layer generates a NAS message and waits.

4) The NAS layer transmits the RRC establishment cause and call type to the AS layer. At this time, the NAS message is not transmitted.

5a-5d) The AS layer of the CIoT device 100 transmits a first message of the random access procedure (i.e., MSG1) (e.g., a random access preamble) to the base station 200. The CIoT device 100 receives a second message (i.e., MSG2) (e.g., a random access response) of the random access procedure from the base station 200. Then, the AS layer of the CIoT device 100 transmits an RRC connection resume request message by including it a third message (i.e., MSG3) of the random access procedure (e.g., a scheduled message). At this time, the resume ID is included in the RRC connection resume request message. The base station 200 transmits a fourth message (i.e., MSG4) of a random access procedure (e.g., an RRC connection resume complete message) to the CIoT device 100. At this time, the RRC connection resume complete message includes a resume ID and a bearer descriptor.

6-7) The base station 200 transmits a UE context resume request message based on the S1-AP to the MME 510. The MME transmits a context resume response message to the base station.

8-9) Meanwhile, the AS layer of the CIoT device 100 transmits an indication to the NAS layer indicating the success of the resumption. The NAS layer enters the EMM connection mode.

10) The NAS layer delivers the pending NAS message to the AS layer.

11) Then, the AS layer of the CIoT device 100 transmits a fifth message of the random access procedure (i.e., MSG5) (e.g., an RRC connection resume complete message) to the base station 200. The resume complete message may include the NAS message.

When FIG. 7 is compared with FIG. 11, in FIG. 7, the CIoT device 100 is inefficient because it can transmit data in the 15th process. However, in FIG. 11, the CIoT device 100 became efficient because it can transmit data in the 11th process.

Figure 12A:
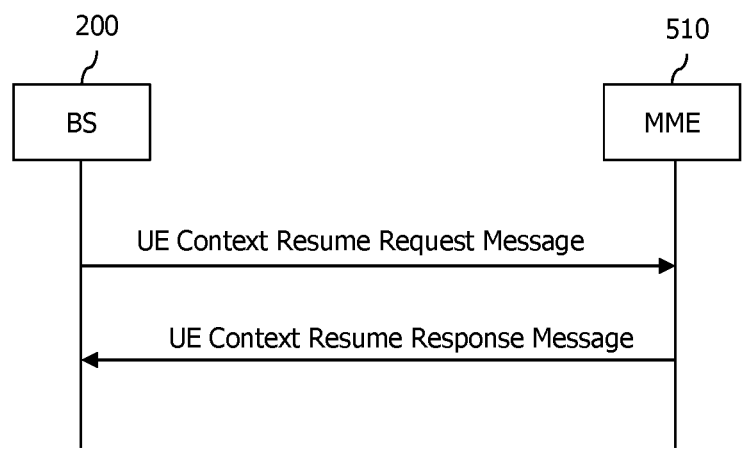
FIG. 12*a* and FIG. 12*b* are diagrams illustrating transmission/reception of a context resume request message between the base station and the MME shown in FIG. 11.
Figure 12B:
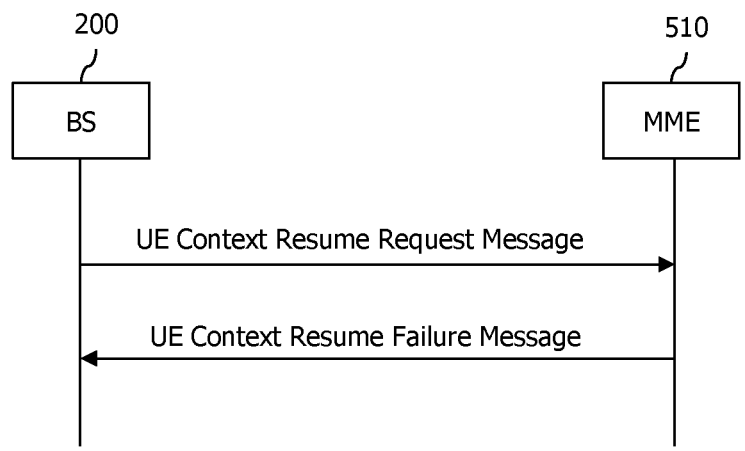

FIGS. 12a and 12b are diagrams illustrating transmission/reception of a context resume request message between the base station and the MME shown in FIG. 11.

As shown in FIGS. 12a and 12b, the base station transmits a UE context resume request message to request the resumption. At this time, if the MME accepts the resumption, the UE transmits a UE context resume response message as shown in FIG. 12a. However, if the MME rejects the resumption, it transmits a UE Context Resume Failure message as shown in FIG. 12b.

If the MME transmits a context resume failure message, the base station performs an RRC release procedure.

Specifically, if the MME cannot resume one E-RAB, it sends a context resume failure message to the base station to release the logic S1 connection related to the CIoT device. When receiving the failure message, the base station releases the RRC connection and releases all associated signaling and user data transmission resources.

4. Early Data Transmission (EDT)

On the other hand, in recent years, there has been a discussion to transmit data more quickly. This is called EDT. In EDT, in the case of DL data between MSG1 and MSG5 of the random access procedure, the DL data is transmitted through MSG2 or MSG4. In the case of UL data, the UL data is transmitted through MSG3.

According to such EDT, the CIoT device can quickly perform early transmission. Once the early transmission is completed, the CIoT device can save power by releasing the RRC connection early.

Figure 13:
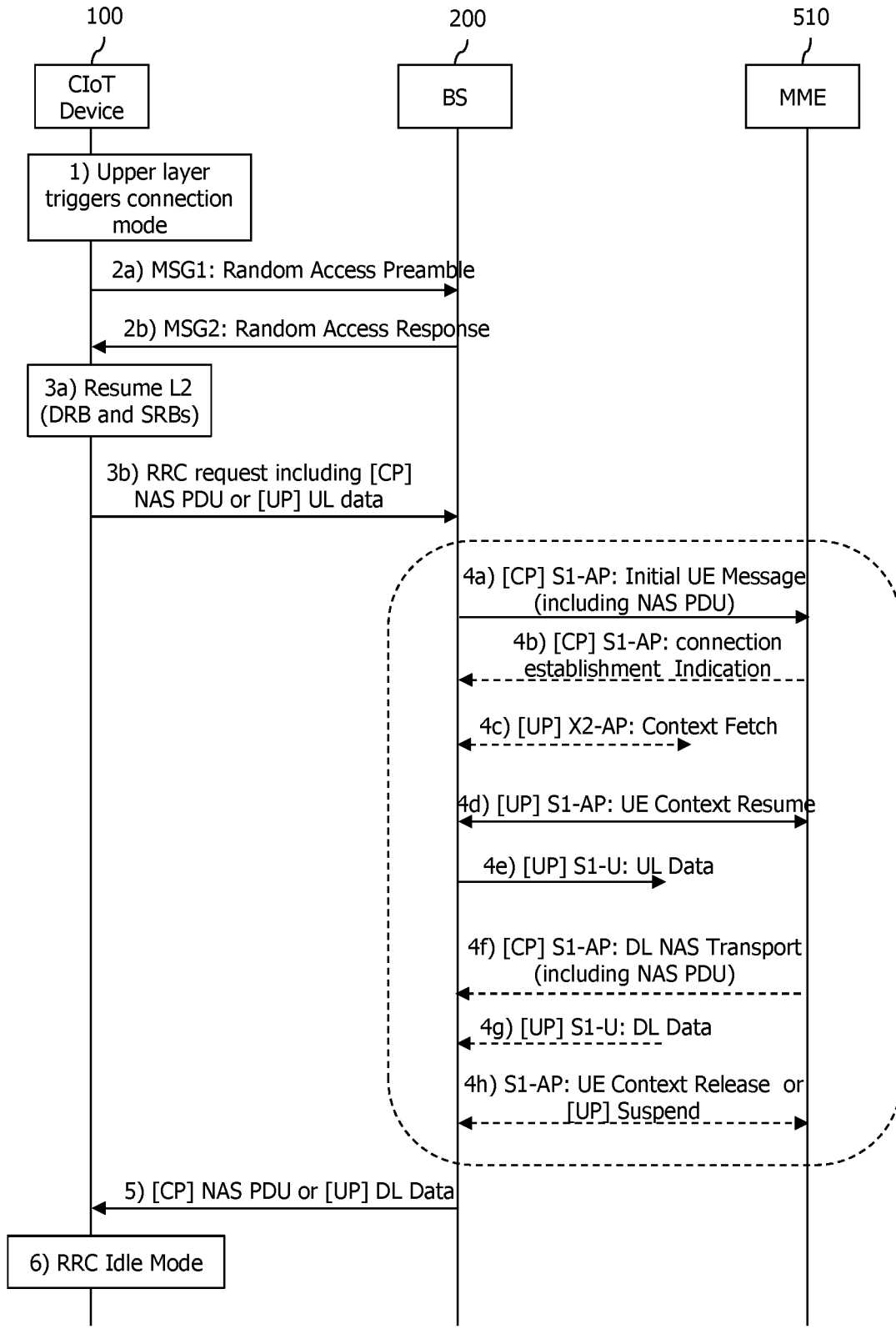
FIG. 13 is a flowchart illustrating a procedure for transmitting data in an early stage according to an EDT.

FIG. 13 is a flowchart illustrating a procedure for transmitting data early according to EDT.

1) The upper layer of the CIoT device 100 triggers the connection mode.

2a-2b) The CIoT device 100 transmits the MSG1 of the random access procedure (i.e., the random access preamble). The MSG1 may indicate that it is for early data transmission.

The base station 200 transmits the MSG2 of the random access procedure (i.e., the random access response message).

3a) When the CIoT device 100 transmits the UP data in the stored CIoT setting, the CIoT device 100 resumes the DRB and the SRB. The AS layer (i.e., the RRC layer) of the CIoT device 100 enters the RRC connection mode.

3b) The AS layer (i.e., the RRC layer) of the CIoT device 100 transmits the MSG3 of the random access procedure. The MSG3 includes an RRC message. In case of the CP EDT, the RRC message includes the NAS message including the NAS PDU, and in the case of UP EDT, the MSG3 may include the UP data.

4a-4c) When the CP EDT is used, the base station 200 may include the NAS PDU in the Initial UE message based on the S1-AP to thereby be transmitted.

4d-4e) Or when UP EDT is used, the base station can transmit the UL data after transmitting the S1-AP based UE context resume request message.

4f) Meanwhile, when there is DL data to be transmitted to the CIoT device 100, and the CP EDT is used, the MME 510 can forward the DL NAS Transport message including the NAS PDU to the base station 200.

4g) or When there is DL data to be transmitted to the CIoT device 100 and UP EDT is used, the DL data can be transmitted to the base station 200 through the S1-U interface.

4h) Thereafter, the base station 200 and the MME 510 can send and receive a UE context release message based on the S1-AP.

5) When CP EDT is used, the base station 200 can forward the NAS PDU including the DL data to the CIoT device 100. Alternatively, when UP EDT is used, the base station 200 may transmit the DL data to the CIoT device 100.

<Problems Intended to be Solved Through the Disclosure of the Present Specification>

The EDT described above has the following problems.

1. The First Problem

First, it is unclear whether the data is transmitted through the CP path or the UP path, which will be specifically described below.

Generally, a CIoT device using CIoT EPS optimization enables an indication indicating whether CP CIoT EPS optimization is used or UP CIoT EPS optimization is used, to be included in MSG5 of the random access procedure, to thereby be transmitted.

The NAS layer of the CIoT device informs the AS layer of the requested CIoT EPS optimization method. That is, in the NB (narrowband) communication, when the NAS layer of the CIoT device requests the RRC connection to the AS layer, if the NAS layer requests the use of the EMM registered state without PDN connection, or requests the use of the UP CIoT EPS optimization, the CIoT device transmits the indication about the requested CIoT EPS optimization to the AS layer. If the CIoT device requests the use of S1-U data delivery without the use of UP CIoT optimization, the CIoT device delivers the indication about the UP CIoT EPS optimization to the AS layer. On the other hand, in WB (WideBand) communication, when the NAS layer of the CIoT device requests RRC connection to the AS layer, if the NAS layer requests the use of the registered state of the EMM without PDN connection or requests the use of the CP CIoT EPS optimization or UP CIoT EPS optimization, the CIoT device transmits an indication about the requested CIoT EPS optimization to the AS layer.

Then, the AS layer generates an RRC connection setup complete message and enables the RRC connection resume complete message to be included in the MSG5 and transmits the MSG5. At this time, if the CIoT EPS optimization is supported, the AS layer enables an attachWithoutPDN-connectivity indication to be included in the message. Also, the AS layer enables up-CIoT-EPS-Optimization indication or cp-CIoT-EPS-Optimization indication to be included in the message according to the request of the NAS layer.

However, in the case of early transmission according to the EDT, the UL data is included in the MSG3 and transmitted. When the CIoT device receives the MSG4, the MSG5 is not transmitted and the RRC connection is released.

That is, when the early transmission is performed according to the EDT, since the RRC connection resumption complete message including the up-CIoT-EPS-Optimization indication or the cp-CIoT-EPS-Optimization indication is not transmitted, it is not possible to know whether to transmit the UL data by the path or by the CP path.

A simple solution to solve this problem is to support only one of CP EDT and UP EDT in EDT.

On the other hand, when switching from the suspended state to the resumed state, all the bearers of the UP have been reactivated in the past. However, there is a problem that, in the suspended state, there is no procedure for resuming the CP only.

2. The Second Problem

In FIG. 9, there is a problem that when the UP EDT is performed according to the conventional method or UP EDT method, if the CIoT device transmits UL data through the MSG3, there is no method for checking whether the CIoT device is successful in transmitting the UL data, which can be described specifically with reference to the suspend and resume procedure.

If the CIoT device in the EMM idle state according to the Suspend Indication transmits UL data via the MSG3 (i.e., including the RRC connection resumption request message), the base station determines whether to accept the resumption. If the base station accepts the resumption, the base station transmits MSG4 (including the RRC connection resume message) to the CIoT device, and then transmits a UE context resume request message to the MME. The CIoT device that has received the MSG 4 internally releases it. Thereafter, the CIoT device enters the EMM idle state. At this time, CIoT devices can switch to eDRX or PSM mode for power saving.

On the other hand, if the MME has received the UE context resume request message but cannot resume any E-RAB, it transmits the UE context resume failure message to the base station, thereby releasing the logical S1-connection associated with the CIoT device. When receiving the UE context resume failure message, the base station releases the RRC connection and releases all related signaling. In addition, the base station releases resources for transferring user data.

As a result, the following problems arise.

If the UL data to be transmitted by the CIoT device is transmitted over the CP path, the resumption procedure may be unnecessary because the UP bearer does not need to be resumed. Therefore, the MME transmits a UE context resume failure message to the base station, and the base station performs the RRC connection release procedure in accordance with the failure message. However, when receiving the MSG 4, the CIoT device performs the RRC connection release as described above, and then switches to the EMM-IDLE mode and further switches to the eDRX or PSM. As a result, the base station cannot perform RRC connection release. However, the problem here is that the CIoT device switches to the EMM idle state and switches to the eDRX or PSM state without knowing whether the transmission of the UL data is successful or failed. If the CIoT device is able to receive the RRC connection release request message from the base station, it can estimate the success of the UL data through the message, but as the CIoT cannot receive the message, the CIoT device cannot determine the success/failure of the UL data.

3. The Third Problem

According to the conventional operation, in order to use the PSM, the CIoT device requests the MME to use the PSM through the TAU procedure and accepts the request. However, if the CIoT device supports EDT, the UL data is transmitted through the MSG3 of the random access procedure, and the RRC connection is released before the TAU request message is transmitted. In this case, the CIoT device cannot use the PSM, and thus the power saving effect cannot be obtained. In this case, even if there is a gain by the EDT, the disadvantage caused by the inability to use the PSM may be greater.

<Disclosure of the Present Specification>

In the following, it is assumed that CIoT devices can support EDT. Hereinafter, it is assumed that when the CIoT transmits the UL data, if the CIoT is in the EMM idle state according to the suspend indication and is in the RRC idle state according to the suspend indication, the CIoT device performs the resume procedure.

I. First Disclosure: Pre-Preparation for EDT

The CIoT device and the network node perform the operations of checking the capability information for the EDT with each other according to one of the following options.

Option A) When checking only the ability information for EDT

In order to perform EDT, the CIoT device should inform the network node of its capability information about the EDT. To this end, the CIoT device may set the EDT support bit within the capability information field in the TAU request message or an attach request message for performing the attach procedure as "EDT supported" so as then to be transmitted. The network node (e.g., MME) that receives the attach request message or the TAU request message also sets "EDT supported" in the EPS network feature support field in the attach acceptance message or the TAU accept message if the EDT is supported, so as then to be transmitted to the CIoT device.

Option B) When identifying EDT-enabled bearers together with capability information for EDT support Unlike option A, it is possible to perform an operation to check bearer information supporting EDT in addition to capability information on EDT support.

B-1) When the operation of checking bearer information supporting EDT is performed together with an attach procedure or a TAU procedure The CIoT device transmits an attach request message or a TAU request message including the bearer information supporting the EDT as well as the capability information on the EDT support, to the network node.

The network node (e.g., MME) checks the attach request message or the TAU request message. At this time, if the network node also supports EDT, it transmits an attach acknowledge message or a TAU accept message including bearer information to be used for EDT among the bearers supporting EDT.

Meanwhile, even if the CIoT device does not enable the bearer information to be included in the message, the network node (e.g., MME) checks the bearer context of the current CIoT device, and may enable information on the bearer supporting the EDT according to the checking to be included in the tag acceptance message or the TAU acceptance message, so as then to be transmitted to the CIoT device.

B-1) When performing an operation to confirm bearer information supporting EDT separately The capability information confirmation for EDT support can be performed according to Option A. Checking the bearer supporting EDT can be performed as follows.

When a CIoT device performs an ESM procedure (for example, a PDN connection request procedure, a bearer resource allocation request procedure, a bearer resource modification procedure), information on a bearer supporting EDT is included in a protocol configuration option (PCO) or an extended PCO so as then to be transmitted to the network node (e.g., P-GW).

If the network node (e.g., P-GW) supports EDT for the corresponding bearer, the network node (e.g., P-GW) transmits an indication indicating that the EDT is supported, to the CIoT device by including the indication in the PCO or Extended PCO. Through this process (ESM procedure), the MME can also check bearer information supporting EDT.

The "EDT supported" can be expressed by subdividing CP EDT and UP EDT. In other words, if CP EDT is supported, it can be expressed as "CP EDT supported", and if UP EDT is supported, it can be expressed as "UP EDT supported".

II. Second Disclosure: UL Data Transmission

The second disclosure relates to a solution for solving the above-mentioned first problem.

When the CIoT device transmits the MSG3 including the UL data (i.e., the RRC connection resume request message), the information on whether the data should be transmitted via the CP path (i.e., whether it is CP data (or data transmitted by CP EDT) or whether the CP EDT method is used) or whether the data should be transmitted via the UP path (i.e., whether it is the UP data or whether the UP EDT scheme is used) may be included in the MSG3 so as then to be transmitted. Specifically, the operation of the CIoT device is as follows.

1) When the application layer of the CIoT device transmits the data to be transmitted to a lower layer (e.g., the NAS layer or the AS layer), indication indicating whether the data to be transmitted is CP data (or data transmitted by CP EDT) or UP data (or data transmitted by the UP EDT) is also transmitted together.

1-A) The following contents are included in the indication or separately transmitted to the lower layer (for example, the NAS layer or the AS layer).

Information on whether the data is a small amount of data, and/or (Subsequent) Information on whether UL data transmission or DL data reception is expected (or Release Assistance Indication (RAI)), and/or Information on whether to perform EDT.

1-B) CIoT devices may consider the following cases internally depending on the triggering path.

The application layer of the CIoT device transmits this information to the AS layer via the NAS layer. At this time, the NAS layer may transmit the information including the EPS bearer ID information intended to be transmitted, to the AS layer. The point of time when the NAS layer transmits the information or the EPS bearer ID information to the AS layer becomes the point of time when the RRC establishment cause and the call type are transmitted when the resume procedure is triggered. Specifically, it is as follows.

If the procedure to use the initial NAS message is triggered while the EMM is idle according to the Suspend Indication, the CIoT device requests the lower layer to resume the RRC connection. At this time, the NAS layer transmits the indication about the EDT to the AS layer. In addition, the NAS layer transmits information on the EPS bearer ID to which data is to be transmitted, an RRC establishment cause, and a call type to the AS layer.

The AS layer of the CIoT device enables data to be included in the MSG3 (including the RRC connection resumption request message) of the random access procedure and transmits the data to the base station. The base station may accept or reject the resume request or indicate a fallback. If the resumption is rejected or the fallback is indicated, an attempt is made to retransmit the data through the conventional operation of the AS layer of the CIoT device.

If the data to be transmitted according to the EDT is CP data (or data transmitted by CP EDT), the generated NAS message may be a CPSR (Control Plane Service Request) message. If the resumption is rejected or a fallback is indicated, retransmission will occur through the data contained in the CPSR.

On the other hand, the information can be sent directly to the AS layer without passing through the NAS layer. That is, the application layer of the CIoT device may forward the information directly to the AS layer. If the EPS bearer ID is not received from the upper layer, the AS layer can know the EPS bearer ID to which the data is transmitted.

2) When receiving the UL data to be transmitted, the indication and information, the AS layer of the CIoT device determines that early transmission is necessary, and performs the following operation together with the resume procedure.

2-A) The AS layer initiates a random access procedure. Specifically, the AS layer of the CIoT device transmits the MSG1, and when successfully receiving the MSG2, the AS layer transmits the MSG3 including the UL data (i.e., including the RRC connection resumption request message) to the base station.

2-B) At this time, the UL data is encrypted with an AS security context (e.g., an authentication token, short MAC-I) stored in the AS layer of the CIoT device and its integrity is guaranteed.

2-C) MSG3 of the random access procedure includes the following indication.

Indication indicating whether it is CP data (or data transmitted by CP EDT) or UP data (or data transmitted by UP EDT), and/or Includes EPS bearer ID or LC (Logical Channel) ID. In the case of CP data (or data transmitted by CP EDT), the information may not be included.

3) When the base station receives the MSG3 including the UL data, it checks whether the corresponding UL data is CP data (or data transmitted by CP EDT) or UP data (or data transmitted by UP EDT). whether the corresponding UL data is CP data (or data transmitted by CP EDT) or UP data (or data transmitted by UP EDT) may also be checked through the EPS bearer ID or LC ID. Further, the base station transmits the S1-AP message to the MME as described later. Further, the base station can determine whether to resume the EPS bearer by checking the received EPS bearer ID or LC ID. In this case, even when another EPS bearer has been resumed, if the EPS bearer cannot be resumed, the base station transmits an RRC connection resumption reject message to notify the CIoT device of the resumption rejection. The rejection message may include cause information indicating the reason for rejection. For CP data (or data transmitted by CP EDT), it may not be necessary to perform a resume. In this case, the base station can directly transmit CP data (or data transmitted by CP EDT) to the MME without performing resumption. In case of CP data (or data transmitted by CP EDT), the UE may transmit a UE context resume request message to the MME.

3-A) If the data transmitted via MSG3 is UP data (or data transmitted by UP EDT), the resume procedure is performed. In other words, the base station transmits a UE context resume request message to the MME. When the MME receives the UE context resume request message, the CIoT device resumes the EPS bearer desired to be transmitted, and then transmits a UE context resume response message to the base station. On the other hand, even when the EPS bearer to which the CIoT device wants to transmit is not resumed and another EPS bearer is resumed, the MME can transmit a UE context resume response message to the base station. However, in this case, since the EPS bearer for transmitting the UL data received from the CIoT device by the base station has not been resumed, resumption of other EPS bearers may be unnecessary. Therefore, it may be efficient to resume only the necessary EPS bearer.

During the resumption procedure, the following optimization operation can be performed.

If the optimization is applied, the base station enables the UE bearer ID received from the CIoT device in process 2) to be included in the UE context resume request message so as then to be transmitted. When the base station receives the LC ID from the CIoT device, the EPS bearer ID mapped to the corresponding LC ID can be found out, and then the EPS bearer ID may be included in the message.

If no optimization is applied, the base station can normally generate and send a UE context resume request message.

3-B) If the data transmitted by the CIoT device through the MSG3 is the CP data (or the data transmitted by the CP EDT), the base station extracts the RRC connection resumption request message in the MSG3 and extracts the UL data which is included in the RRC connection resumption request message. Then, the base station enables the extracted UL data to be included in the S1-AP message and transmits it to the MME. The S1-AP message may be a reuse of a normal UE context resume request message or an Initial UE message, a modification thereof, or a newly defined message. The S1-AP message may include a separate indication indicating that the CP data (or data transmitted by the CP EDT) is included. The specific operation is as follows.

In the case of the Initial UE message,

An IE (Information Element) may be added as a container for CP data (or data transmitted by CP EDT) in the Initial UE message in order to include CP data (or data transmitted by CP EDT). The CP data (or the data transmitted by the CP EDT) may be included in the IE or the CP data (or the data transmitted by the CP EDT) may be included in the existing NAS-PDU IE.

Indication indicating that it is the CP data (or data transmitted by the CP EDT) only in the case where the CP data (or data transmitted by the CP EDT) is included in the existing NAS-PDU IE, may be included.

In the case of the UE context resume request message

E-RAB Failed To Resume List is not included. As a container for CP data (or data sent by CP EDT) in order to contain CP data (or data transmitted by CP EDT), a new IE may be added in the message. The newly added IE may include CP data (or data transmitted by CP EDT).

For new S1-AP messages

At least the message type, the ID of the S1-AP, may be included in the message.

The message includes CP data (or data transmitted by CP EDT). The message may include an indication indicating that separate CP data (or data transmitted by CP EDT) is included.

4) When the MME receives the S1-AP message, it operates as described below.

4-A) In the case of UP data (or data transmitted by UP EDT)

4-A-i) When the optimization of the process 3-A) is applied, the MIME receiving this can resume only the E-RAB bearer corresponding to the received EPS bearer ID.

If the E-RAB bearer is successfully resumed, a UE context resume response message is transmitted to the base station.

The base station receiving this transmits the UP data (or the data transmitted by UP EDT) through the resumed S1-U bearer without performing the DRB setup with the CIoT device. After transmitting the UP data (or the data transmitted by the UP EDT), the base station can inform the CIoT device whether the UP data (or the data transmitted by the UP EDT) is successfully transmitted. The RRC message indicating the transmission success/failure may be a general RRC message (e.g., an RRC connection release message) or a new RRC message. The RRC message includes cause information indicating whether UL data transmission is successful.

If the resumption of the E-RAB bearer fails, a UE context resume failure message is transmitted to the base station. The message includes cause information indicating whether the data transmission is successful. The cause information may indicate a specific reason of failure. For example, the cause information may indicate that the requested EPS bearer ID cannot be resumed.

The base station receiving this can notify the CIoT device of the cause information while transmitting the RRC release message or the RRC resume rejection message.

The CIoT device receiving this recognizes that the data transmission has failed. The reason for failure can be specifically recognized based on the cause information.

4-A-ii) If no optimization is applied, the MME generates and transmits a UE context resume response message or a UE context resume failure message conventionally.

4-B) In the case of CP data (or data transmitted by CP EDT), the MME having received the S1-AP message transmitted by the base station in process 4) recognizes successful resumption in the base station (for example, the resumption test was successful), checks the CP data (or data transmitted by the CP EDT) included in the S1-AP message, and determines whether to transmit the corresponding CP data (or data transmitted by the CP EDT).

4-B-i) If the MME does not send the CP data (or the data sent by the CP EDT) (rejects the transmission), it notifies the CIoT device of the rejection and the reason for the rejection. To this end, the MME transmits an S1-AP message to the base station. The S1-AP message may be a reuse of a general S1-AP message (e.g., a Downlink NAS Transport message or a UE context resume failure message), a modified message, or a newly defined message.

When reusing or modifying a general S1-AP message, it is determined which S1-AP message is to be used according to the S1-AP message used in the process 3-B). For example, when the Initial UE message is used in the process 3-B), if the Downlink NAS Transport message or the UE context resume request message is used, the UE context resume failure message is used. The message may include cause information indicating the reason for the rejection.

At this time, if the DL data to be transmitted to the CIoT device is waiting in the MME, it is transmitted together with the base station. The DL data may be included in the S1-AP message so as to be transmitted.

4-B-ii) When the MME desires to transmit CP data (or data transmitted by CP EDT), it checks the EPS bearer ID to be transmitted and checks through which interface the CP data (or the data transmitted by the CP EDT) should be transmitted. Specifically, the MME can confirm the PDN connection with the SCEF or the P-GW based on the EPS bearer ID included in the message.

When the MME has decided to transmit the CP data (or the data transmitted by the CP EDT), or when the transmission is successful, the MME may transmit the S1-AP message to the base station or perform the S1 release procedure. The S1-AP message may be a reuse of a general S1-AP message (e.g., a Downlink NAS Transport message or a UE context resume failure message), a modified one, or a newly defined message.

When reusing or modifying a conventional S1-AP message, it is determined which S1-AP message is to be used according to the S1-AP message used in the process 3-B). For example, if the Initial UE message, the Downlink NAS Transport message, or the UE context resume request message is used in the process 3-B, the UE context resume failure message is used. The message may include an indication indicating successful transmission of the CP data (or data transmitted by the CP EDT).

Both the 4-C UP data (or the data transmitted by the UP EDT) and the CP data (or the data transmitted by the CP EDT) are transmitted to the base station when the DL data to be transmitted to the CIoT device is waiting in the MME.

4-C-i). Here, the DL data should be data of a size, which can be transmitted by including it in a general RRC message (e.g., MSG4 (i.e., RRC connection setup message, RRC connection reject message, RRC connection resume message or RRC connection release message) (in other words, data of a size which can be transmitted by EDT). The MME or the S-GW recognizes the allowed size information of the data, and transmits the DL data to the base station only when the DL data is of the allowed size. The operation can be performed only when there is no more buffered DL data in addition to the DL data. Specifically, when the MME has DL data to be transmitted to the CIoT and there is no buffered DL data in addition to the DL data, this situation can be notified to the base station. More specifically, when transmitting a Downlink NAS Transport message including NAS PDU (including the DL data), the MME may enable an indication indicating that there is no data to be additionally transmitted to be included in the Downlink NAS Transport message so as then to be transmitted. The base station confirms that there is no additional data in addition to the NAS PDU (the DL data). Information on the allowed size of the data may be preset or may be recognized by the MME or the S-GW through signaling (e.g., signaling from the base station to the MME and/or from the base station to the S-GW and/or from the MME to signaling).

When the DL data is CP data (or data transmitted by CP EDT), the MME determines whether EDT is applied to the DL data. When the EDT is applied to the DL data, the MME enables the CP data (or the data transmitted by the CP EDT) to be included in a NAS message (e.g., a CPSR message) and transmits the data to the lower layer (i.e., the S1-AP layer). Further, the MME transmits an 'EDT' indication to the lower layer indicating that it is an EDT. The lower layer receiving this enables the NAS message including the CP data (or the data transmitted by the CP EDT) and the EDT indication to be included in the S1-AP message (e.g., a downlink NAS transport message) so as then to be transmitted to the base station.

If the DL data is UP data (or data transmitted by UP EDT), the S-GW determines whether the DL data is EDT applied. The MME can inform the S-GW that the EDT application for a particular bearer is activated, when performing the process 4). Alternatively, the S-GW can know in advance whether EDT application for a particular bearer has been activated, through the first disclosure. According to the above conditions, when EDT is applied to the DL data, the S-GW transmits UP data (or data transmitted by UP EDT) to the base station. When the optimization of process 3-A) is applied, it transmits an 'EDT' indication to the MME indicating that it is an EDT. The MME receiving the indication transmits an 'EDT' indication indicating that it is an EDT to a lower layer (i.e., the S1-AP layer). The lower layer receiving this enables the EDT indication to be included in the S1-AP message (e.g., UE Context Release command message) and transmits it to the base station.

4-C-ii) If the corresponding DL data is CP data (or data transmitted by CP EDT), the S1-AP message including the DL data includes an indication indicating that the data is for EDT.

4-C-iii) When the corresponding DL data is UP data (or data transmitted by UP EDT) and the optimization of the process 3-A) is applied, the following operation is performed.

And if there is a resumed/established bearer for transmitting the DL data (for example, when it is the data of the same bearer as the bearer of the UL data transmitted in the process 4), it is transmitted to the corresponding base station.

When there is no resumed/established bearer for transmitting the DL data (for example, when it is not the data of the same bearer as that of the UL data transmitted in the process 4), or when the resumption procedure does not operate or is not successful at the time of transmitting UL data or signaling), a DRB with an additional S1-U bearer for transmitting the DL data should be established.

In this case, the S-GW transmits a DDN (Downlink Data Notification) message to the MME according to the related art.

The MME having received the DDN transmits an E-RAB setup request message including bearer information to establish the corresponding bearer. The E-RAB setup request message includes the E-RAB ID and related information (e.g., E-RAB level QoS parameters) of the bearer for transmitting the DL data. The MME receives and confirms the E-RAB setup response message indicating that the E-RAB setup for the corresponding bearer has been successfully performed, and transmits the DDN response message to the S-GW.

When receiving the DDN response message, the S-GW transmits the DL data to the base station.

4-C-iv) If waiting (buffered) DL data cannot be transmitted to the EDT,

In the case of transmission of downlink CP data (or data transmitted by CP EDT), a procedure for transmitting CP data (or data transmitted by CP EDT) is performed.

In the case of transmission of downlink UP data (or data transmitted by UP EDT), the MME performs conventional operations for establishing the S1-U connection and the DRB in the conventional manner. For example, if the base station does not have a UE context, an initial context setup procedure is performed. Or if there is a UE context in the base station but the corresponding bearer is not activated, the E-RAB setup procedure is performed.

5) When the base station receives the S1-AP message of process 4), it operates as described below. At this time, if the DL data is waiting (buffered), the base station transmits the DL data to the CIoT device.

5-A) In the case of UP data (or data transmitted by UP EDT)

5-A-i) When the optimization of the process 3-A) is applied,

If the MME succeeds in resuming the corresponding E-RAB bearer in process 4) and the MME transmits a UE context resume response message to the base station, the base station receiving this transmits the corresponding data through the resumed S1-U bearer.

If the MME fails to resume the E-RAB bearer in process 4) and transmits a UE context resume failure message to the base station, the message includes cause information indicating whether the data transmission is successful. The cause information may indicate a specific reason for failure. For example, the cause information may indicate that the requested EPS bearer ID cannot be resumed.

5-A-ii) If the optimization of process 3-A) is not applied

If the MME successfully resumes in process 4) and transmits the UE context resume response message to the base station, the base station checks whether the EPS bearer for transmitting the UL data received in process 3) is resumed. When the EPS bearer is resumed, the base station transmits corresponding data through the resumed S1-U bearer.

If the MME fails to resume in process 4) and the UE context resume failure message is sent to the base station, 5-B) In case of CP data (or data transmitted by CP EDT), it receives the S1-AP message described in process 4), and the base station recognizes the success or failure of UL data transmission. If the CIoT device detects a transmission failure from the base station through the RRC message, the CIoT device can attempt retransmission through the RRC connection that has not been released. Specifically, if the RRC connection is not released, the CIoT device may retransmit MSG5 (i.e., an RRC Connection setup complete message) or another RRC message.

5-C) In the cases of both UP data (or data transmitted by UP EDT) and CP data (or data transmitted by CP EDT), the following applies. In the case of UP data (or data transmitted by UP EDT), the following applies regardless of whether optimization is applied.

The base station receives the S1-AP message including the DL data described in process 4), and when it recognizes that there is no additional data to be transmitted, it enables the corresponding DL data to be included in the MSG4 and tries to transmit the MSG4 to the CIoT device. If the DL data is CP data, it is included in the RRC message of the MSG4, and if the DL data is UP data, it may be transmitted on a DTCH separately from the RRC message of the MSG4. The base station checks whether the DL data is of a size that can be included in the MSG4, and if the DL data is of a size that can be transmitted to the MSG4, the base station enables the DL data to be included in the MSG4 so as then to be transmitted. If the DL data is of a size that cannot be included in the MSG4 or fails to be transmitted to the MSG4, after the MSG4 transmission (i.e., transmission of the RRC connection setup message), after moving to the RRC connected state, the transmission of the corresponding DL data is attempted, or the DL data is enabled to be included in the S1-AP message or an indication indicating the DL data transmission failure is enabled to be included in the S1-AP message so as then to be transmitted. The base station transmits an RRC message to the CIoT device. The RRC message may be an RRC connection release message or another RRC message. The RRC message includes cause information indicating transmission success or failure. The cause information may indicate a specific reason for failure. For example, the cause information may indicate failure of resumption of the EPS bearer When transmitting the DL data, the corresponding DL data may be included in an existing RRC message (e.g., MSG4 (i.e., an RRC connection setup message, an RRC connection reject message, an RRC connection resume message or an RRC connection release message) so as then to be transmitted. Alternatively, a message for transmitting DL data may be an RRC message other than the RRC connection release message. If the base station desires to transmit an RRC connection release message, the DL data is successfully transmitted to the AS layer of the CIoT device, and the RRC connection release message may then be transmitted to the CIoT device.

At the point of time when the base station transmits the RRC message to the CIoT device, if the CIoT device is in the RRC idle state (i.e., if the base station does not transmit the MSG4), another RRC message other than the RRC connection release message may be transmitted. The RRC message may be an RRC connection setup message or an RRC connection reject message.

6) The CIoT device recognizes the success or failure of the UL data transmission. The CIoT device can specifically recognize the reason according to the cause information. In case of failure, retransmission may be attempted according to the cause information. In case of failure, the CIoT device can determine whether to retransmit according to the cause information. If the UL data fails and retransmission can be attempted, the NAS layer or the RRC layer of the CIoT device can perform the retransmission in the EMM connection state or the RRC connection state without switching to the EMM idle state or the RRC idle state.

In the above description, the EDT indication can be expressed by the cause information.

In the above, it was described assuming the transmission of the CIoT in the EMM idle state according to the suspend indication in the case of the CP data (or the data transmitted by the CP EDT). However, it may not be necessary to perform the resume procedure when transmitting CP data (or data transmitted by CP EDT) according to the EDT. This is because it is not necessary to establish a UL bearer when the UL data is CP data (or data transmitted by CP EDT). Hence, when the CIoT device transmits the CP data (or the data transmitted by the CP EDT) according to the EDT when the CIoT device is in the EMM idle state according to the suspend indication, the NAS layer of the CIoT device switches to the EMM idle state, and then the CP data (or the data transmitted by the CP EDT) can be transmitted. In this case, when the CP data (or the data transmitted by the CP EDT) is transmitted according to the EDT, the resume procedure may not be performed until the process 3). Meanwhile, while resuming the context of the CIoT device, the base station may receive an RRC message (e.g., an RRC connection request message or a new RRC message) for transmitting CP data (or data transmitted by CP EDT) from the CIoT device. Thereafter, the base station can delete the context of the corresponding CIoT device which is resuming. The base station extracts CP data (or data transmitted by CP EDT) included in the NAS message in the corresponding RRC message in the RRC idle state or the EMM-idle state.

Then, the base station encapsulates the extracted CP data (or data transmitted by the CP EDT) in the UL NAS transport message, and transmits the encapsulated CP data to the MME.

The description about the CP data (or data transmitted by CP EDT) explained from the above process 4) can be applied regardless of whether the UP optimization is used. In other words, the above description can be applied even when the CIoT device transmits the CP data (or the data transmitted by the CP EDT) to the uplink in the EMM idle state.

As described above, the CIoT device in the EMM idle state may apply the EDT according to the suspend indication only when the initial NAS message is not transmitted to the network node (i.e., the MME), to thereby transmit the UP data (or data transmitted by the UP EDT). In other words, EDT should not be performed if the initial NAS message needs to be delivered to the network node.

In the following cases i), ii) and iii), the initial NAS message is not transmitted to the network node when the resumption procedure is successful.

When the EMM is in the idle state according to the suspend indication, the CIoT device switches to the EMM connection mode if it receives an indication from the lower layer that the RRC connection has resumed. The NAS message is as follows.
i) Service Request message
ii) the CPSR message, when the CIoT device does not include the ESM container, the NAS message container, or the EPS Bearer Context State IE
iii) when the extended service request message and the service type IE indicate "packet services via S1", and the CIoT device does not include the EPS bearer context status IE, The message is not transmitted. Otherwise, the CIoT device encrypts the message and, when switched to the EMM connection mode, transmits the initial NAS message.

If the NAS message is discarded and not forwarded to the network node, the value of the uplink NAS COUNT corresponding to the message may be reused for the next uplink NAS message to be transmitted.

In the resumption procedure of the above-described process 3-A, all bearers in the bearer context of the conventional CIoT device have been resumed. However, in the case of EDT, it is proposed to resume only a specific bearer since it is typical to transmit using only a specific bearer. On the other hand, it was described above that the CIoT device includes the ESP bearer ID in the MSG3, and thus the corresponding bearer ID is transmitted to the MME. However, even if the CIoT device does not transmit the ESP bearer ID in some cases, the base station can enable the bearer ID to be resumed to be included in the S1-AP message. For example, if a bearer for EDT has already been promised/set between the CIoT device and the network node, the base station can enable the EPS bearer ID to be included in the S1-AP message so as then to be transmitted even though the Bearer ID has not been received from the CIoT device.

III. Third Disclosure: Judgment on Whether UL Data Transmission is Successful

In order to solve the second problem, the third disclosure proposes a method of allowing the CIoT device to know whether the UL data transmission is successful. Option 1) described below is about a scheme of additionally using a timer in the resume procedure, and Option 2) is about a scheme of improving the resume procedure.

Option 1) Scheme of using a timer

The AS layer of the CIoT device transmits MSG3 (i.e., an RRC connection resume request message) to the base station. If the base station accepts the resumption, it sends MSG4 (i.e., an RRC connection resume message) to the AS layer of the CIoT device. At this time, the message may include an in-activity timer. The AS layer of the CIoT device that has received the MSG4 starts a timer Txx. At this time, if the in-activity timer is included in the MSG4, the timer Txx is set by the in-activity timer. If the in-activity timer does not exist in the MSG4, the CIoT device sets the timer Txx according to the set value. If the signaling (e.g., an RRC connection release message) or data is received from the base station while the timer Txx is running, the CIoT device stops the timer Txx. When the timer Txx expires, the CIoT device internally releases the RRC connection and switches to the EMM idle state. In this case, the CIoT device that was using the eDRX continues to use the eDRX.

Option 2) Scheme of modifying the conventional resume procedure. This will be described with reference to the drawings.

Figure 14A:
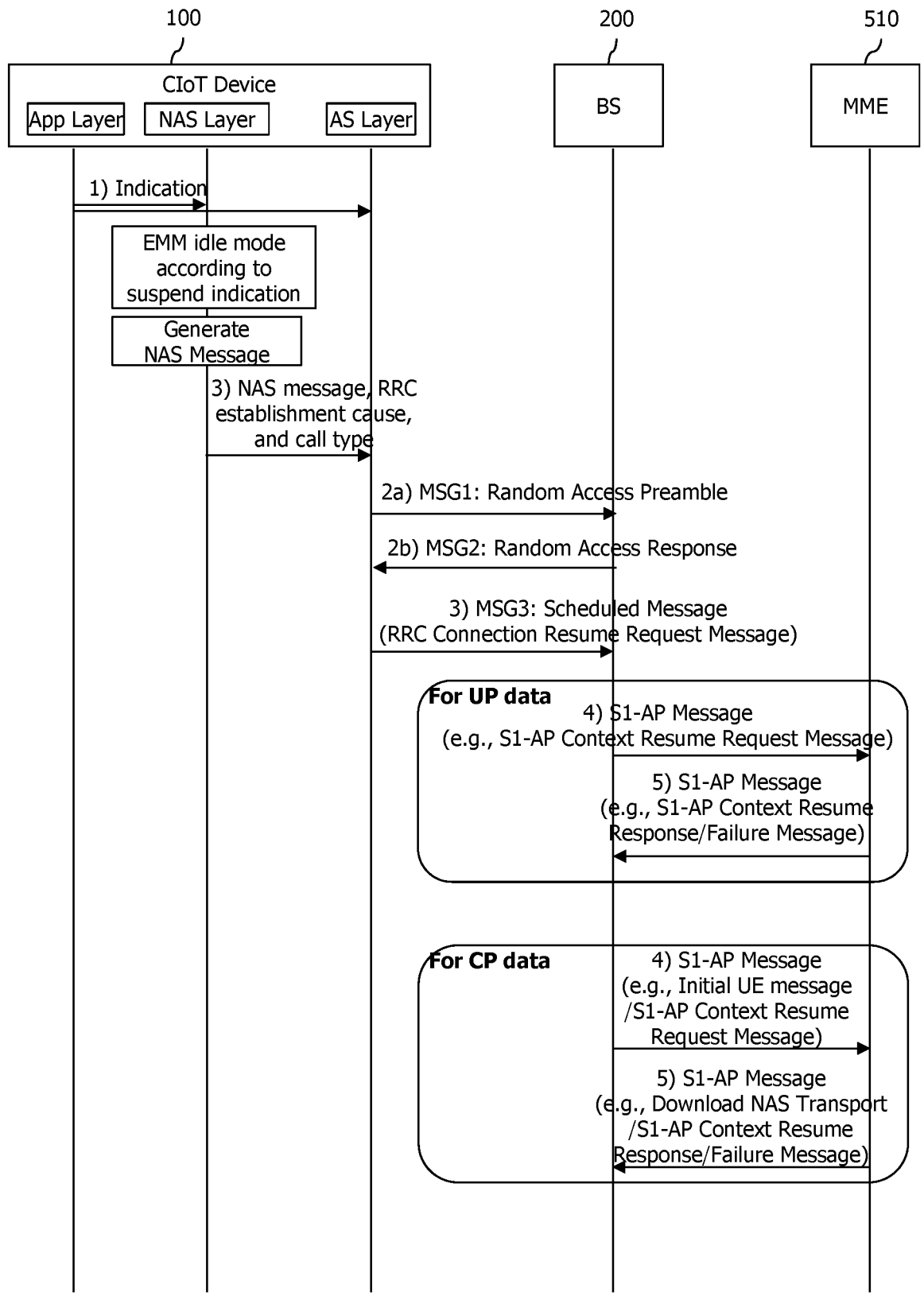
FIG. 14*a* and FIG. 14*b* are flowcharts illustrating a procedure for transmitting data according to an EDT.
Figure 14B:
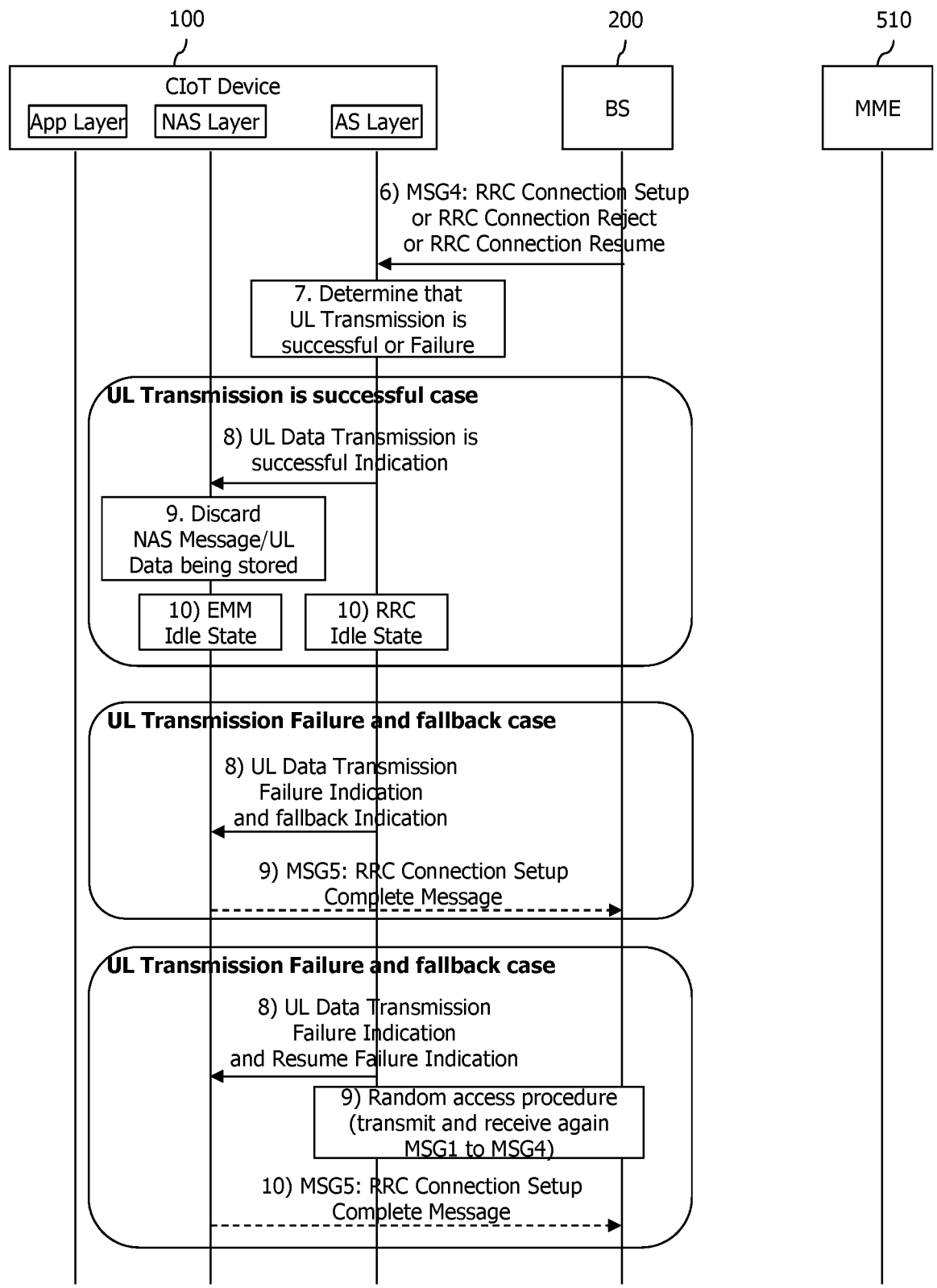

FIGS. 14a and 14b are flowcharts illustrating a procedure of transmitting data according to an EDT.

In the following, only the general resumption procedure and the distinction will be explained.

As described in the first disclosure, only when the CIoT device is in the EMM idle state according to the Suspend Indication and the initial NAS message is not sent to the network node (i.e., MME), the EDT may be applied to thereby transmit the UP data (Or data transmitted by the UP EDT). In other words, EDT should not be performed if the initial NAS message needs to be delivered to the network node. If the CIoT device is in an EMM idle state according to the Suspend Indication, and if the EDT is applied to transmit the CP data (or data sent by the CP EDT), the NAS layer of the CIoT device will enter the EMM idle state and then transmit the CP data (or the data transmitted by the CP EDT). That is, the contents described later in the third disclosure assume that the CIoT device transmits UP data (or data transmitted by UP EDT) when it is in the EMM idle state according to the suspend indication.

1) The AS layer of the CIoT device receives an indication from the upper layer. The details about this have already been described with respect to process 1 and process 2 of the first disclosure. The AS layer of the CIoT device performs the resume procedure when receiving the indication.

At this time, the NAS layer can operate by one of the following two schemes.

1-i) The NAS layer of the CIoT device does not buffer (or pend) the initial NAS message, and directly delivers the initial NAS message to the AS layer. At this time, the RRC establishment cause and the indication that the call type and the EDT are possible can be transmitted together. That is, it is transmitted to the AS layer of the CIoT device (i.e., the RRC layer of the CIoT device). The AS layer of the CIoT device (i.e., the RRC layer of the CIoT device) enables the size of the UL data (i.e., data volume information) to be transmitted through the MSG3 or the EDT indication to be included in the MSG1 so as then to be transmitted, to thereby request allocation of the radio resource for EDT to the MSG3. When the AS layer of the CIoT device (i.e., the RRC layer of the CIoT device) receives the MSG2, scheduling information for UL data transmission according to the EDT can be confirmed through the MSG2. That is, it can be checked whether radio resources for UL data transmission according to the EDT has been allocated. When the scheduling of the UL data transmission according to the EDT is checked through the MSG2, the UL data (the initial NAS message including the UL data in the case of the CP data (or the data transmitted by the CP EDT)) is included in the MSG3 and transmitted. However, if it is confirmed that the scheduling information for the UL transmission according to the EDT is not included in the MSG2, the AS layer of the CIoT device (i.e., the RRC layer of the CIoT device) can perform a general resume procedure. That is, the AS layer transmits a resume request message to the base station, thereby performing a general resume procedure.

1-ii) The NAS layer of the CIoT device buffers (or pends) the initial NAS message, transmits the RRC establishment cause, the indication that call type and EDT are possible, and the size information of the initial NSA message including UL data which is being buffered (or pending) (i.e., data volume information), to the AS layer of the CIoT device (i.e., the RRC layer of the CIoT device), and performs the following procedure. The AS layer of the CIoT device (i.e., the RRC layer of the CIoT device) enables the UL data size (i.e., data volume information) or EDT indication to be transmitted to the MSG 3 to be included in the MSG 1 so as then to be transmitted, to thereby request allocation of radio resources for the MSG3 according to the EDT. The AS layer of the CIoT device (i.e., the RRC layer) receives the MSG2 and can confirm the scheduling information for UL data transmission according to the EDT through the MSG2. That is, it is possible to check the scheduling information for the UL data transmission according to the EDT through the MSG2. When the scheduling information for UL data transmission according to the EDT is confirmed through the MSG2, the AS layer of the CIoT device transmits indication to the upper layer (i.e., the NAS layer) that the EDT is possible or that the resumption is successful. The upper layer (that is, the NAS layer) that receives the indication performs the conventional operation when it receives an indication that the resume is successful. Then, the AS layer of the CIoT device enables the UL data (the initial NAS message including the UL data in the case of the CP data (or the data transmitted by the CP EDT)) to be included in the MSG3 so as then to be transmitted. However, if scheduling information is not included in the UL data transmission according to the EDT within the MSG2, the AS layer (i.e., the RRC layer) of the CIoT device can perform a general resume procedure. That is, the AS layer transmits a resume request message to the base station, thereby performing a general resume procedure.

2) The AS layer of the CIoT device transmits the MSG1 to the base station, and the base station transmits the MSG2 to the AS layer of the CIoT device.

3) When the AS layer of the CIoT device receives the MSG2, the AS layer of the CIoT device transmits MSG3 (e.g., an RRC connection resume request message) to the base station and waits for a response from the base station.

4) When the base station receives the MSG3 (i.e., the RRC connection resumption request message) from the AS layer of the CIoT device, it does not transmit the MSG4 (RRC connection resume message or RRC connection setup message or RRC connection reject message) to the CIoT device, and transmits S1-AP message to the MME. The details about the type of the S1-AP message, the information (IE) included therein, and related procedures have already been explained in the first disclosure.

In this case, when the CIoT device transmits UP data (or data transmitted by UP EDT), the S1-AP message transmitted by the base station to the MME may include a UE context resume request message.

However, when the CIoT device transmits CP data (or data transmitted by CP EDT), the S1-AP message that the base station transmits to the MME may be a message as described in the first disclosure.

5) The MME receiving this determines the transmission and/or resumption of the corresponding data. According to the determination, the MME transmits the S1-AP to the base station. Herein, the details about the type of the S1-AP message, the information (IE) included therein, and related procedures have already been described in the above first disclosure.

When the CIoT device transmits UP data (or data transmitted by UP EDT), the S1-AP message transmitted by the MME to the base station may be a UE context resume response or a UE context resume failure message. Details on which of the two messages are to be transmitted have already been described in the above first disclosure.

On the other hand, when the CIoT device transmits CP data (or data transmitted by CP EDT), the S1-AP message that the MME transmits to the base station may be a message as described in the first disclosure.

6) The base station receiving this can transmit the RRC message to the CIoT device. At this time, the details about the type of the RRC message, the information (IE) included in the RRC message, and related procedures have already been described in the above first disclosure.

7) The CIoT device can recognize the success or failure of transmission of the UL data transmitted from the received RRC message.

7-A) When UL data transmission is successful

The AS layer of the CIoT device transmits an indication indicating that the UL data transmission is successful, to the NAS layer. Specifically, the AS layer transmits the indication about the result on resumption (success, failure, fallback) and suspend, to the NAS layer. If the AS layer of the CIoT device is in the RRC connection state, it can switch to the RRC idle state after receiving the RRC connection release message. If the RRC connection release message is not received, the AS layer internally releases the RRC connection and enters the RRC idle state. If the AS layer is in the RRC idle state, it remains in that state. In the case of conventional eDRX, it switches to the eDRX state. When the NAS layer of the CIoT device recognizes that the UL data transmission is successful, it discards the NAS message which is being buffered (or pending) and switches to the EMM idle state. When the suspend indication is received, the EMM is switched to the idle state according to the indication.

7-B) If the CIoT device determines that transmission of UL data has failed, retransmission may be attempted. The AS layer of the CIoT device transmits the indication of the transmission failure, to the NAS layer of the CIoT device. When the NAS layer of the CIoT device receives the indication, it operates as follows. In the case of CP data (or data transmitted by CP EDT), when retransmission is attempted through MSG5, and in the case of UP data (or data transmitted by UP EDT), retransmission is attempted after a DRB (Data Radio Bearer) is established.

For reference, the transmission timing of MSG4 was not described in the first disclosure. The first disclosure may be applied with the conventional resumption procedure or may be applied with the second disclosure.

IV. Fourth Disclosure: A Method for Using PSM

In the fourth disclosure, a method for using eDRX or PSM is proposed to solve the third problem.

In the following, a method for using PSM is described, but the following description can be applied to a method for using eDRX, too.

According to a general operation, when outgoing (MO) data is generated in a CIoT device in a PSM mode, a TAU request message should first be transmitted. In the case of transmitting the TAU request message, there is no meaning of the effect of performing the EDT operation, so that there are difficulties in coexistence of the two technologies.

The CIoT device that performs EDT in PSM mode should be able to continue using the PSM without performing the TAU procedure.

Recently used parameters are used as they are for the PSM related operation parameters.

The point of time when the CIoT device enters PSM mode again

It may be the point of time when the CIoT device described in the first and second disclosures receives the RRC message (MSG4) from the base station after transmitting the UL data to the MSG3.

or the point of time when the timer expires in option 1) of the second disclosure. The network node (e.g., MME) may also be aware of the point of time when the CIoT device re-enters the PSM, through the operation.

The transmission of the RRC message of the base station can be recognized by the MME because it is triggered by the MME, and if the base station notifies the MME when the timer expires, it can be recognized.

Another method a) When a CIoT device currently using PSM transmits an MSG3, an indication requesting continued use of PSM is included in the MSG3. b) The base station receiving it transmits it to the MME by including it in the S1-AP message. c) When receiving the S1-AP message from the base station, if the MME accepts the continued use of PSM of the CIoT device, the MME transmits an indication indicating that the PSM should be continuously used by including the indication in the S1-AP message, which is the response message, and herein, the base station transmits the indication together with the RRC message, to the CIoT device. Even when the MME declines to continue to use the PSM, the indication is delivered to the CIoT device through the same scheme.

In the above, the MME can start the procedure without the processs a and b. In this case, the MME recognizes that the CIoT device is currently in use of the PSM mode, and performs the above operation when recognizing that the CIoT device is currently in the EDT mode.

Not all of the above-described entire processes are implemented, and only some processes may be implemented.

The above description can also be applied to a 5G system. The following shows the relationship that the technical term used in the conventional EPC (LTE) is mapped to the technical term used in the 5G system. The above description can be applied to the 5G system according to the mapping shown in the following table. In 5G, the interface between MME-EMM is mapped to AMF, the MME-ESM is mapped to SMF, the interface between MME-EMM and MIME-AMF is mapped to N11, and the interface between MME-EMM and base station is mapped to N2.

TABLE 2

| EMM connection mode (RRC connection mode) | CM connection mode (RRC connection mode/ RRC active mode) |
| --- | --- |
| eNodeB(eNB) | gNB |
| MME | AMF (or SMF) |
| MME-EMM (Layer) | AMF (Layer) |

TABLE 2-continued

| EMM connection mode (RRC connection mode) | CM connection mode (RRC connection mode/ RRC active mode) |
| --- | --- |
| MME-ESM (Layer), S-GW control plane function, P-GW control plane function | SMF (Layer) |
| User plane function of S-GW User plane function of P-GW | UPF (Layer) |
| S1-AP (Interface/Message) | N2 (Interface/Message) |
| NAS (Signaling connection/interface) | N1 (Connection/Interface) |

V. Fifth Disclosure The fifth disclosure suggests a method for resuming only the bearer corresponding to UP data (or data transmitted by UP EDT) in the second disclosure. That is, in general, the base station resumes all bearers, but the fifth disclosure proposes to resume only the bearers corresponding to the specific UP data (or data transmitted by UP EDT) included in MSG3.

In the existing UP EPS CIoT optimization, the network attempts to resume all bearers of the UE. When the base station receives the RRC connection resumption request message, the base station transmits a S1-AP-based UE context resume request message including a list of all successfully resumed bearers. When receiving the S1-AP-based UE context resume request message, the MME resumes all bearers in the message and transmits a Modify Bearer Request message. The S-GW resumes all bearers contained in the Modify Bearer Request message. Then, an S1-U bearer corresponding to the successfully resumed bearer is established.

Figure 15:
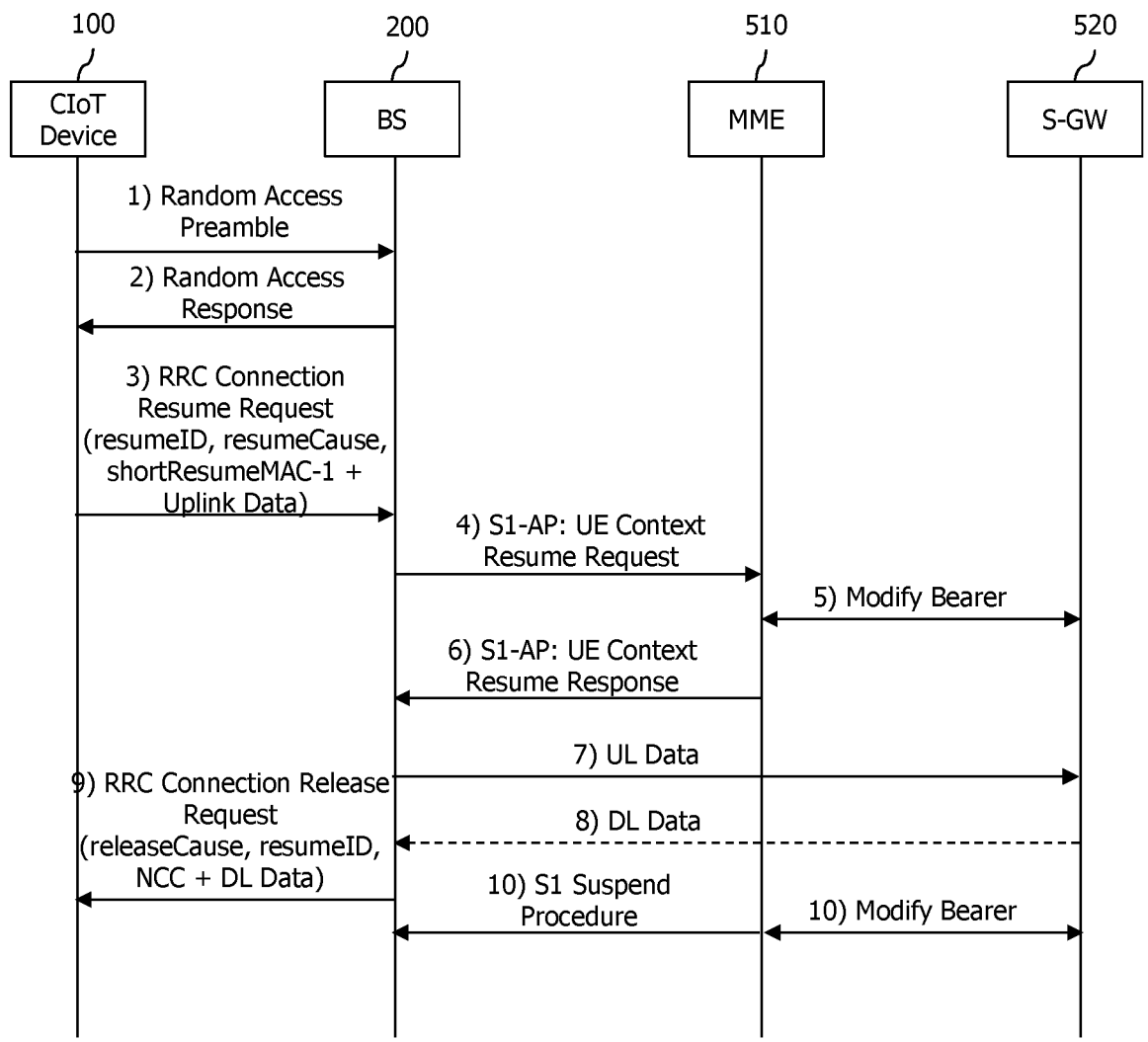
FIG. 15 shows an example of EDT application for UP CIoT optimization.

FIG. 15 shows an EDT application example for UP CIoT optimization.

Referring to FIG. 15, when a base station receives an RRC connection resume request message including UP EDT data, the base station can find the bearer ID corresponding to the UP EDT data.

Therefore, the base station does not have to send a request message for resuming bearers other than the bearer associated with the UP EDT data, to the MME.

That is, the UE context resume request message transmitted by the base station in process 4 of FIG. 15 is used not only to notify the MME that the CIoT device has resumed the RRC connection but also to request the MME to resume the UE context, UE-related logic S1 connection and its related bearer context.

That is, if the base station does not accept all suspendd E-RABs, the base station may include an 'E-RAB Failed to Resume' list in the UE context resume request message. The 'E-RAB Failed to Resume' list may include information on an E-RAB that does not need to be resumed.

On the other hand, when the base station requests resumption of the bearers other than the bearer corresponding to the received UP EDT data, unnecessary S1-U bearers that are not used can be established.

Assuming that the ID of the bearer corresponding to the UP EDT data transmitted through the MSG3 is 1, it is as follows.

Option 1: If the base station requests resumption of all bearers as in the past, The base station transmits an S1-AP-based UE context resume request message including a list of all bearers. If the MME fails to resume the bearer having the bearer ID of 1 but succeeds in resuming other bearers, the MME transmits information on the resumed bearer to the base station through the S1-AP based UE context response message, and transmits the Modify Bearer Request message. Then, since the base station has failed to resume the bearer having the bearer ID of 1, the base station transmits an RRC connection rejection message to the CIoT device and transmits an S1 UE context release request message to the MME. The MME performs an S1 release procedure.

Option 2: If the base station responds to UP EDT data transmitted via MSG3 and requests to resume a bearer with a bearer ID of 1, the base station sets the bearer ID=1 in the bearer list in the S1-AP context resumption request message so as then to be transmitted. If the MME fails to resume bearer with ID=1 of the bearer, the MME transmits a UE context resume failure message based on the S1-AP, to the base station. Then, the base station transmits an RRC connection rejection message to the CIoT device.

As described above, in contrast to Option 2, Option 1 requires additional signaling.

Therefore, when the base station receives the MSG3 including the UP EDT data, it is effective for the base station to request the MME to only resume the bearer corresponding to the UP EDT data.

On the other hand, when the CIoT device is in the suspended state, the CIoT device may not perform the resume procedure if it sends sending (MO) CP EDT data via MSG3.

The detailed procedure of the CIoT device to implement this is as follows.

Assumption) Condition in which the NAS layer of the CIoT device in EMM idle state performs EDT according to the suspend indication Case 1) If the following NAS message is triggered, or When resumption is successful, the message (not actually transmitted) that the NAS layer does not deliver to the lower layer may be the initial NAS message, as described above.

Case 2) When a NAS message that transmits CP data (or data transmitted by CP EDT) has been triggered, the control plane service request (CPRS) message, the ESM message container in the CPRS message may contain an ESM data transmission message.

Upper step concept of proposed content:

Common: Judge whether EDT can be performed by CIoT device

The CIoT device judges that EDT can be performed when the following conditions are satisfied.

when the maximum grant size for the EDT provided as the SIB is greater than the EDT data and/or If the above conditions are satisfied, an EDT request is made through the MSG1 of the random access procedure, and if the MSG2 (i.e., the random access response) is received, whether the EDT can be performed is determined. Specifically, if a grant (i.e., resource allocation) sufficient to transmit EDT data via MSG3 is acquired via MSG2, it can be determined that EDT data transmission is possible.

Case 1) It is possible to perform the conventional resumption procedure regardless of whether EDT can be performed or not in the above-described assumption. That is, the CIoT device can transmit the MSG3 (i.e., the RRC connection resume request message) and receive the MSG4 as before.

Case 2) In the above-described assumption, if it is determined that the EDT is executable, the CP EDT data transmission procedure can be performed without performing the resume procedure. However, if it is determined that the EDT cannot be performed, the CIoT device can perform the conventional resume procedure. That is, the CIoT device can transmit the MSG3 (i.e., the RRC connection resume request message) and receive the MSG4 as before.

By conventional operation, it is possible to transmit CP data (or data transmitted by CP EDT) via MSG5 (i.e., RRC connection setup complete message).

When the NAS layer buffers (or pends) the initial NAS message and requests the AS layer (i.e., RRC layer) to perform resumption, and in the case of the assumption 2, the NAS layer should provide the data volume information within the NAS message, which is being buffered (or pending), to the AS layer (i.e, the RRC layer). The data volume information is used as information for determining whether EDT is performed Modified example of Case 2) In the above-described assumption, the resume procedure may not be performed regardless of whether EDT is executable. In this case, the operation in the conventional UP EPS CIoT optimization should also be improved. That is, when the CIoT device is in EMM idle state according to the suspend indication, even in the case that the transmission of the control plane service request (CPSR) message including the CP data (or the data transmitted by the CP EDT) is triggered (or in the case that the CPSR message including CP data (or data transmitted by CP EDT) is transmitted through MSG5), the resume procedure may not be performed. The method for implementing this is as follows. When the NAS layer of the CIoT device is in the EMM idle state according to the suspend indication, if the transmission of a CPSR message including CP data (or data transmitted by CP EDT) is triggered, a CPSR message including the corresponding CP data (or data transmitted by the CP EDT) is transmitted after switching to the EMM idle state.

In the case of the above modified example, the conventional procedure (UP EPS CIoT optimization) should be improved.

V-1. Implementation Options

On the other hand, implementation options for implementing the above proposal will be described below.

The NAS layer of the CIoT device can finally judge whether or not to perform the resume.

V-1-1. Option 1

V-1-1-A. Option 1-A

The NAS layer of the CIoT device can operate according to the information on whether the EDT is executable of the AS layer of the CIoT device. Specifically, it is as follows.

Process 1: The following conventional operation is performed in the NAS layer of the CIoT device.

If the Suspend Indication triggers a procedure that uses the Initial NAS message in the EMM idle state, the NAS layer of the CIoT device requests the AS layer to resume the RRC connection. In a request to the AS layer, the NAS layer may provide the AS layer with a RRC establishment cause and a call type. In the case of EDT, Release Indication RAI (Release Assistance Indication) and/or EDT indication together with RRC establishment cause and call type are provided to the AS layer (i.e., RRC layer).

Process 2: The AS layer of the CIoT device can determine whether EDT is executable. Note the high-level concept described above Process 2-1: If it is determined that EDT can be performed, the AS layer transmits an indication to the NAS layer of the CIoT device indicating that EDT can be performed, and proceeds to the following 3-1 process.

Process 2-2: If it is determined that EDT cannot be performed, the resume procedure is performed as before.

Process 3: In the case of process 2-1,

Case A) If a message buffered (or pending) by the NAS layer of the CIoT device is an NAS message CP data (or data transmitted by the CP EDT) (i.e., CPSR message including ESM data transmission message in the ESM message container), the following information is added to the AS layer of the CIoT together with the NAS message and the mode is switched to the EMM idle state. Then process 4 is performed. The NAS layer delivers an indication to the AS layer indicating that the NAS message is a NAS message for transmitting CP data (or data transmitted by the CP EDT). The indication may be transmission of CP EDT or CP data (or data transmitted by CP EDT). The NAS layer can send an indication to the AS layer indicating that it should not perform resumption or it should switch to the idle state.

Case B) If the message currently buffered (or pending) by the NAS layer of the CIoT device is a NAS message containing CP data (or data sent by CP EDT) (i.e., CPSR message including an ESM data transfer mesh in the ESM message container) CPSR message), it sends an acknowledgment (ACK)/response indication to the AS layer of the CIoT device.

Process 4: In case A) of the process 3, the AS layer of the CIoT device transmits the MSG3 of the random access procedure to transmit the NAS message transmitting the CP data (or the data transmitted by the CP EDT), and does not perform the resumption procedure. However, in case B) of process 3, the AS layer of the CIoT device performs the resumption procedure.

V-1-1-B. Option 1-B

The NAS layer of the CIoT device can notify the AS layer only when transmission of the NAS message including CP data (or data transmitted by the CP EDT) is triggered. The AS layer of the CIoT device can perform additional distinguishing operation with the NAS layer of the CIoT device according to information on whether the EDT is executable.

Process 1: The following conventional operation is performed in the NAS layer of the CIoT device.

If the Suspend Indication triggers a procedure that uses the Initial NAS message in the EMM idle state, the NAS layer of the CIoT device requests the AS layer to resume the RRC connection. In a request to the AS layer, the NAS layer may provide the AS layer with a RRC establishment cause and a call type. In case of EDT, RAI (Release Assistance Indication) and/or EDT indication are provided to the AS layer (i.e., RRC layer) together with RRC establishment cause and call type.

If a message buffered (or pending) by the NAS layer of the CIoT device is a NAS message (i.e., a CPSR message including an ESM data transfer mesh in an ESM message container) containing CP data (or data transmitted by CP EDT), the NAS layer delivers an indication to the AS layer indicating that the NAS message is a NAS message for transmitting CP data (or data transmitted by the CP EDT). The indication may be transmission of CP EDT or CP data (or data transmitted by CP EDT).

Process 2: The AS layer of the CIoT device can determine whether EDT is executable. Note the upper step concept described above Process 2-1: If it is determined that EDT can be performed, the AS layer transmits an indication to the NAS layer of the CIoT device indicating that EDT can be performed, and proceeds to the following 3-1 process.

Process 2-2: If it is determined that EDT cannot be performed, the resume procedure is performed as before.

Process 3: In process 2-1, the NAS layer of the CIoT device transmits the following information to the AS layer of the CIoT device along with the NAS message including the currently buffered (or pending) CP data (or the data transmitted by the CP EDT), and then switches to EMM-IDLE. The NAS layer may indicate to the AS layer indicating that the resume should not be performed or the mode should be switched to the idle state.

Process 4: The AS layer of the CIoT device transmits the MSG3 of the random access procedure to transmit the NAS message transmitting the CP data (or the data transmitted by the CP EDT) and does not perform the resume procedure.

V-1-1-C. Option 1-C

The NAS layer of the CIoT device does not request a resume and can determine whether the resumption is requested according to the type of the NAS message which is currently buffered (or pending) after receiving information on whether the EDT is successful from the AS layer of the CIoT device, which will be specifically described below.

Process 1: The NAS layer of the CIoT device does not perform an operation for requesting resumption in the following conventional operation.

If the procedure of using the Initial NAS message in the EMM idle state is triggered according to the suspend indication, the NAS layer of the CIoT device can provide the AS layer with the RRC establishment cause and call type.

In the case of EDT, RAI (Release Assistance Indication) and/or EDT indication are provided to AS layer (i.e., RRC layer) together with RRC establishment cause and call type.

Process 2: The AS layer of the CIoT device can determine whether EDT is executable. Note the upper step concept described above Process 2-1: If it is determined that EDT can be performed, the AS layer transmits an indication indicating that EDT can be performed, to the NAS layer of the CIoT device.

Process 2-2: If it is determined that EDT cannot be performed, the indication that the EDT cannot be performed is transmitted to the NAS layer of the CIoT device.

Process 3:

In the case of the process 2-1,

Case A) When the currently buffering (pending) NAS message is a NAS message that transmits CP data (or data transmitted by CP EDT), the NAS layer of the CIoT device switches to EMM-IDLE, and transmits the NAS message to the AS layer of the CIoT device.

Case B) The NAS layer of the CIoT device sends a request for the resumption of the RRC connection to of the AS layer of the CIoT device when the pending NAS message is not a NAS message transmitting CP data (or data transmitted by CP EDT).

In the case of process 2-2,

Case C) The NAS layer of the CIoT device transmits a request to resume the RRC connection to the AS layer of the CIoT device.

Process 4:

In case A) of the process 3, the AS layer of the CIoT device transmits the MSG3 (for CP EDT) to transmit the NAS message transmitting the CP data (or the data transmitted by the CP EDT) and does not perform the resume procedure.

In cases B) and C) of the process 3, the AS layer of the CIoT device performs the resume procedure.

V-1-2. Option 2

The AS layer of the CIoT device performs the final determination as to whether to perform the resume.

Process 1. In the case of EDT, the NAS layer of the CIoT device does not pend the initial NAS message as in the conventional operation in the EMM idle state, and can directly deliver the initial NAS message to the AS layer of the CIoT together with the RRC establishment cause and the call type. Then, the NAS layer transmits a resume request of RRC connection to the AS layer of the CIoT device.

In the case of EDT, the NAS layer provides the RRC establishment cause, RAI and/or EDT indication together with the call type, to the AS layer (i.e., the RRC layer).

In addition, the NAS layer informs the AS layer of the CIoT device whether the NAS message is a NAS message (i.e., a CPSR message) transmitting CP data (or data transmitted by CP EDT).

In the case that the message is the NAS message that transmits CP data (or data transmitted by CP EDT), the indication may be CP EDT or CP data (or data transmitted by CP EDT) transmission.

Process 2: The AS layer of the CIoT device can determine whether EDT is executable. Note the above step concept described above Process 2-1: If it is determined that EDT is executable, Case A) If the NAS message received in process 1) is a NAS message including CP data (or data transmitted by CP EDT)

The AS layer of the CIoT device transmits the MSG3 (for CP EDT) of the random access procedure in order to transmit the NAS message containing the CP data (or the data transmitted by the CP EDT). At this time, the AS layer does not perform the resume procedure, but notifies the NAS layer of the CIoT device of this. The NAS layer of the CIoT device then moves to an EMM idle state.

Case B) If the NAS message received in process 1) is not a NAS message transmitting CP data (or data transmitted by CP EDT), the AS layer of the CIoT device performs a resume procedure.

Process 2-2: If it is determined that EDT cannot be performed, the resume procedure is performed as before.

Comparison between options: Option 1-B) allows different actions to be performed only when a NAS message transmitting CP data (or data transmitted by CP EDT) is generated, which can be implemented without any further improvement to the case where other NAS messages are generated compared to other options.

The above-described proposals can be used in combination with each other.

What has been described so far can be implemented in hardware. This will be described with reference to the drawings.

Figure 16:
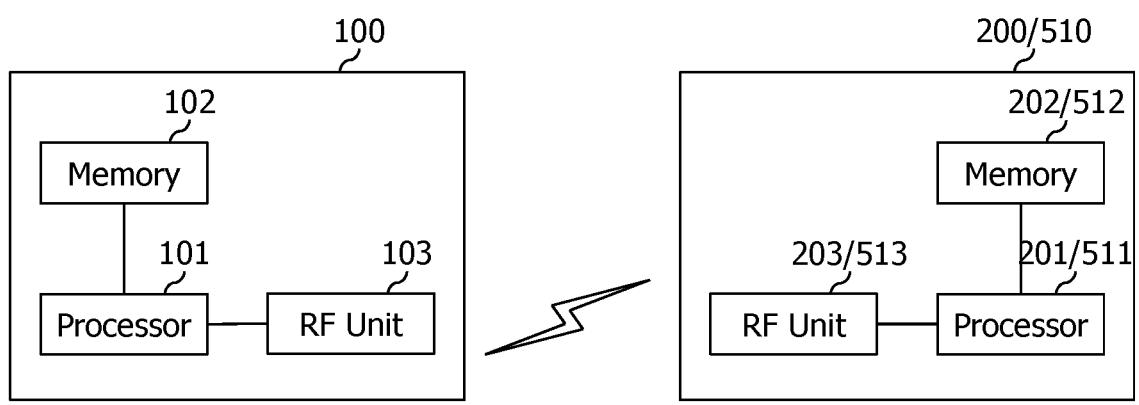
FIG. 16 is a block diagram illustrating the configuration of a CIoT device 100 and a network device according to an embodiment of the present invention.

FIG. 16 is a configuration block diagram of a CIoT device 100 and a network device according to an embodiment of the present invention.

As shown in FIG. 16, the CIoT device 100 includes a processor 101, a memory 102, and a transmission/reception unit 103. And the network device may be a base station 200 or a MME/SGSN 510. This network device 200 or 510 includes a processor 201 or 511, a memory 202 or 512, and a transmission/reception unit 203 or 513.

The memories 102, 202 or 512 store the above-described method.

The processors 101, 201 and 511 control the memories 102, 202 and 512 and the transmission/reception units 103, 203 and 513, respectively. Specifically, the processors 101, 201, and 511 execute the methods stored in the memories 102, 202, and 512, respectively. The processors 101, 201, and 511 transmit the above-described signals through the transmission/reception units 103, 203, or 513.

The present invention has been described with reference to exemplary embodiments, but the scope of the present invention is not limited to such embodiments, and thus the present invention can be modified, changed and improved in various forms within the concept of the present invention and the scope of the claims.

What is claimed is:

1. A method performed by a base station supporting an Early Data Transmission (EDT), the method comprising:
    receiving, from a user equipment (UE), a third message (MSG3) for a random access procedure, the MSG3 including an uplink data based on the EDT;
    transmitting, to a Mobility Management Entity (MME), an initial UE message comprising the uplink data based on the EDT;
    receiving, from the MME, a first non-access-stratum (NAS) message in response to the initial UE message, wherein the first NAS message comprises (i) downlink data for transmission by the base station to the UE and (ii) an indication related to the EDT; and
    based on the received indication related to the EDT in the first NAS message from the MME: determining that there is no further downlink data, aside from the downlink data in the first NAS message.

2. The method of claim 1, wherein the first NAS message comprises a downlink NAS transport message.

3. The method of claim 1, further comprising:
    transmitting, to the MIME, a UE context resume request message.

4. The method of claim 1, further comprising:
    transmitting, to the UE, a radio resource control (RRC) message including the downlink data.

5. The method of claim 1, wherein the downlink data in the first NAS message comprises a NAS protocol data unit (PDU).

6. A base station configured to support an Early Data Transmission (EDT), the base station comprising:
    at least one transceiver;
    at least one processor; and
    at least one computer memory operably connectable to the at least one processor and storing instructions that, when executed by the at least one processor, perform operations comprising:
    receiving, through the at least one transceiver and from a user equipment (UE), a third message (MSG3) for a random access procedure, the MSG3 including an uplink data based on the EDT;
    transmitting, through the at least one transceiver and to a Mobility Management Entity (MME), an Initial UE message comprising the uplink data based on the EDT;
    receiving, through the at least one transceiver and from the MME, a first non-access-stratum (NAS) message in response to the initial UE message, wherein the first NAS message comprises (i) downlink data for transmission by the base station to the UE and (ii) an indication related to the EDT; and
    based on the received indication related to the EDT in the first NAS message from the MME: determining that there is no further downlink data, aside from the downlink data in the first NAS message.

7. The base station of claim 6, wherein the first NAS message comprises a downlink NAS transport message.

8. The base station of claim 6, wherein the operations further comprise:
    transmitting, through the at least one transceiver and to the MME, a UE context resume request message.

9. The base station of claim 6, wherein the operations further comprise:
    transmitting, through the at least one transceiver to the UE, a radio resource control (RRC) message including the downlink data.

10. The base station of claim 6, wherein the downlink data in the first NAS message comprises a NAS protocol data unit (PDU).

* * * * *